US007042826B2

(12) United States Patent
Matsui

(10) Patent No.: US 7,042,826 B2
(45) Date of Patent: May 9, 2006

(54) OPTICAL PICK-UP APPARATUS ACHIEVING HIGH NUMERICAL APERTURE, OPTICAL CONVERGING SYSTEM THEREFOR, AND RECORDING AND/OR REPRODUCING METHOD UTILIZING THEM

(75) Inventor: Takumi Matsui, Hachioji (JP)

(73) Assignee: Konica Corporation, Tokyo (JP)

( * ) Notice: Subject to any disclaimer, the term of this patent is extended or adjusted under 35 U.S.C. 154(b) by 298 days.

(21) Appl. No.: 10/086,547

(22) Filed: Mar. 4, 2002

(65) Prior Publication Data
US 2002/0136147 A1    Sep. 26, 2002

(30) Foreign Application Priority Data
Mar. 21, 2001    (JP)    ............................... 2001-080168

(51) Int. Cl.
*G11B 7/00* (2006.01)
(52) U.S. Cl. .................... 369/112.24; 369/112.03; 369/94; 369/44.37
(58) Field of Classification Search ........... 369/112.24, 369/112.23, 94, 44.37, 112.03
See application file for complete search history.

(56) References Cited

U.S. PATENT DOCUMENTS

| | | | | | |
|---|---|---|---|---|---|
| 3,589,812 | A | * | 6/1971 | Robert et al. | 356/33 |
| 4,339,177 | A | * | 7/1982 | March | 359/707 |
| 4,387,133 | A | * | 6/1983 | Ichikawa et al. | 428/215 |
| 4,504,616 | A | * | 3/1985 | Uehara et al. | 524/398 |
| 5,936,928 | A | * | 8/1999 | Jain et al. | 369/99 |
| 5,948,544 | A | * | 9/1999 | Kim et al. | 428/480 |
| 5,995,475 | A | * | 11/1999 | Gelbart | 369/112.24 |
| 6,054,503 | A | * | 4/2000 | Ichikawa et al. | 522/96 |
| 6,091,549 | A | * | 7/2000 | McDonald et al. | 359/637 |
| 6,143,826 | A | * | 11/2000 | Ohnaga et al. | 525/93 |
| 6,198,069 | B1 | * | 3/2001 | Hackel et al. | 219/121.6 |
| 6,243,350 | B1 | * | 6/2001 | Knight et al. | 369/126 |
| 6,292,453 | B1 | * | 9/2001 | Ichimura et al. | 369/112.24 |
| 6,317,276 | B1 | * | 11/2001 | Braat | 359/785 |
| 6,349,083 | B1 | * | 2/2002 | Kiriki et al. | 369/112.23 |
| 6,404,498 | B1 | * | 6/2002 | Maeda et al. | 356/394 |
| 6,568,594 | B1 | * | 5/2003 | Hendriks et al. | 235/454 |
| 6,594,205 | B1 | * | 7/2003 | Aarts et al. | 369/44.23 |
| 6,621,787 | B1 | * | 9/2003 | Lee et al. | 369/275.1 |
| 2004/0179273 | A1 | | 9/2004 | Ishikawa et al. | |

OTHER PUBLICATIONS

Webster, New Riverside University Dictionary, Riverside Publishing, 1994 p. 551.*

* cited by examiner

*Primary Examiner*—Gautam R. Patel
(74) *Attorney, Agent, or Firm*—Finnegan, Henderson, Farabow, Garrett & Dunner, L.L.P.

(57) ABSTRACT

An optical pickup apparatus for recording and/or reproducing information for an optical information recording medium having a plurality of information recording layers, comprising: a light source to emit a light flux; and a converging optical system to converge the light flux emitted from the light source onto each information recording layer of the plurality of information recording layers. The converging optical system converges a light flux having an image side-numerical aperture of 1.0 or more onto the each information recording layer so as to conduct recording and/or reproducing information for the each information recording layer.

100 Claims, 9 Drawing Sheets

OPTICAL PICK-UP APPARATUS ACHIEVING HIGH NUMERICAL APERTURE, OPTICAL CONVERGING SYSTEM THEREFOR, AND RECORDING AND/OR REPRODUCING METHOD UTILIZING THEM

BACKGROUND OF THE INVENTION

The present invention relates to an optical pick-up apparatus to record and reproduce the information onto the optical information recording medium having a plurality of information recording layers, in layer-like, and a light converging optical system of the optical pick-up apparatus, and optical information recording and reproducing method, and particularly to an optical pick-up apparatus to record or reproduce the information onto a laminated plurality of information recording layers, by using a luminous flux whose image side numerical aperture is not smaller than 1.0, using an evanescent light, a light converging optical system of the optical pick-up apparatus, and optical information recording and reproducing method.

Recently, accompanied by putting to practical use of the short wavelength red semiconductor laser, a DVD (digital versatile disk) whose dimension is almost the same as the CD (compact disk) which is the conventional optical disk, that is, optical information recording medium, and whose capacity is largely increased and which is the high density optical disk, is developed, and put into the market, however, it is forecasted that, in near future, the higher density next generation optical disk is also comes into the market. In the optical system of the optical information recording and reproducing apparatus using such the optical disk as the medium, in order to intend to highly increase the density of the recording signal, or to reproduce the high density recording signal, it is required that the spot diameter which is light converged onto the recording medium through the light converging optical system is reduced. For such the requirement, as a solution means the optical element using the principle of near field is proposed. The high NA of such the optical element is attained by using the evanescent light which is leaked from a solid immersion lens opposite to the information recording surface, and for example, it is written in Japanese Tokkai No. 2000-99990.

However, when the information is recorded or reproduced to the optical information recording medium by using the evanescent light, because the evanescent light has the characteristic which rapidly attenuates corresponding to the distance, it is necessary that the information recording surface is formed on the surface of the optical information recording medium. However, a fact that the information recording surface is formed on the surface of the optical information recording medium, is that the protective layer can not be provided on the information recording surface. Accordingly, when it is used only in the hermetically shielded space, such the optical information recording medium can be used, however, for the removable optical disk such as the CD or DVD whose presupposition is that the user exchanges it by his hand, it is difficult that the information is recorded or reproduced by using the evanescent light.

Further, in order to intend to record or reproduce the high density information, the multi-layer type optical information recording medium in which the information recording layer is laminated, is also developed. When the recording or reproducing of the information is conducted onto such the optical information recording medium, it is a problem how makes the information recording light including the evanescent light form an image onto each of information recording layers.

SUMMARY OF THE INVENTION

The present invention is attained in view of the forgoing conventional technological problem, and an object of the present invention is to provide an optical pick-up apparatus by which the high density optical information recording or reproducing can be conducted onto the multi-layer type optical information recording medium, a light converging optical system of the optical pick-up apparatus, and optical information recording or reproducing method.

DETAILED DESCRIPTION OF THE PREFERRED EMBODIMENT

Hereinafter, the structure to attain the above object will be explained.

A first structure of the optical-pickup apparatus of the invention_is an optical pick-up apparatus which has a light source, and a light converging optical system to light converge onto any of information recording layers of the optical information recording medium having the laminated plurality of information recording layers, and in the optical pick-up apparatus in which the recording or reproducing of the information is conducted onto the optical information recording medium, because the light converging optical system records or reproduces the information onto the information recording layer by light converging the luminous flux whose image side numerical aperture is not smaller than the 1.0, onto the optical information recording layer, the high density optical information recording or reproducing can be conducted onto the optical information recording medium. In this connection, as such the light converging optical system, so called a solid immersion lens, SIL, or SIM (which will be described later), is included, but, it is not limited to this.

In the optical system of the conventional optical pick-up apparatus, it is difficult to attain more than the image side numerical aperture (NA) of 1.0. The reason will be described below. The image side numerical aperture is defined as n·sin θ (n is the refractive index of the medium of the image space, and the θ is a half angle of the maximum cone angle in the medium of the image space), however, in the optical pick-up apparatus, when the recording and reproducing of the information is conducted onto the recording medium rotating like the CD, the air layer absolutely exists between the optical system and the recording medium, and its refractive index n is 1. Further, because $-1 \leq \sin\theta 1$, the NA is 1 at the maximum, and in the actual image formation, the NA can only have a value not larger than 1.

As described above, in the optical pick-up apparatus, on the presupposition that the air layer exists between the optical system and the optical information recording medium, when the image side numerical aperture (NA) can attain more than 1, because the spot diameter in the information recording layer can be reduced very small, the recording density of the optical information recording medium is increased, and while intending to reduce the size of the recording medium, the larger capacity information can be recorded or reproduced. Further, in the optical information recording medium having a plurality of information recording layers, an increase of the volume recording density can be intended.

Figure 1:
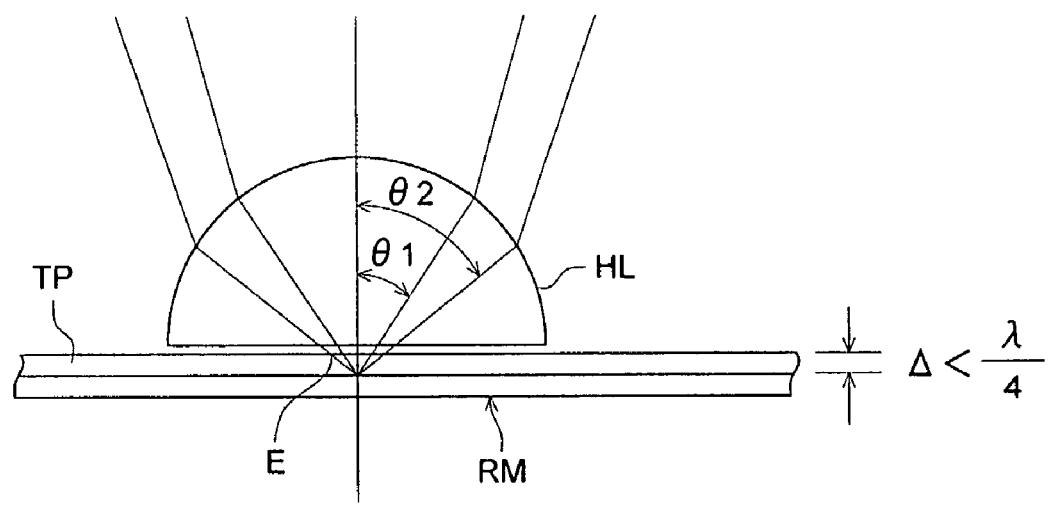
FIG. 1 is a sectional view of a final optical element (almost semi spherical lens) constituting a portion of an objective lens of the present invention.

In opposition to this, in the present invention, as an example of the optical system to attain the image side numerical aperture (NA), which is not smaller than 1, a light converging optical system using the effect of the near field is provided. Herein, the providing of the light converging optical system using the effect of the near field will be described below. FIG. 1 is a sectional view of the final optical element (almost semi-spherical lens) constituting a portion of the light converging optical system of the present invention. The luminous flux incident to the almost semi-spherical lens transmits within the range of the first predetermined angle θ1, and is irradiated onto the recording medium RM. However, for the luminous flux exceeding the first predetermined angle θ1, it is totally reflected on the lower surface of the almost semi-spherical lens HL, and as the result, it is said that the luminous flux is not effectively irradiated onto the recording medium RM.

Herein, when the light is totally reflected on the lower surface of the almost semi-spherical lens HL, there is a phenomenon that the evanescent light leaks out to the recording medium RM. Such the effect is called the near field effect, and the leaked-out light is called the evanescent light E. The evanescent light E has the characteristic that, after it is emitted from the almost semi-spherical lens HL, as the distance is larger, the light exponentially attenuates. Accordingly, when the distance A between the lower surface of the almost semi-spherical lens HL and the upper surface of the recording medium RM is larger, the evanescent light E attenuates and it can not be effectively used for the recording or reproducing of the information. However, when it is set that the distance A between the almost semi-spherical lens HL and the upper surface of the recording medium RM is smaller, (for example, lower than the wavelength of the transmitted light), because, before the evanescent light E attenuates, the light reaches the recording medium RM, the light can be used for the recording or reproducing of the information. That is, when the recording or reproducing of the information is conducted by using the luminous flux within the range which exceeds the first predetermined angle θ1 and which is to the second predetermined angle θ2 and which is totally reflected, the light converging optical system whose image side numerical aperture (NA) is not smaller than 1.0 can be structured. In this connection, the light converging optical system is not only the above final optical element, but may also be structured of a plurality of optical elements. Further, when the distance Δ is smaller than the wavelength of the information recording light used for the recording or reproducing of the information, it can be effectively used before the attenuation of the evanescent light.

In a second structure of the optical pick-up apparatus of the invention, the light conversing optical system has the final optical element opposite to the optical information recording medium, and the final optical surface of the final optical element is in contact with the surface of the optical information recording medium. Thus, the luminous flux to a predetermined angle θ2 is not totally reflected on the lower surface of the almost semi-spherical lens HL and transmits it, and the recording or reproducing of the information can be conducted.

In a third structure of the optical pick-up apparatus of the invention, the light converging optical system has the final optical element opposite to the light information recording medium, and the final optical surface of the final optical element approximates to the surface of the optical information recording medium by spacing the distance not larger than one fourth of the wavelength of the light source. Thus, the recording or reproducing of the information can be conducted by using the evanescent light E.

In a fourth structure of the optical pick-up apparatus of the invention, a plurality of light converging optical systems are provided, and each of light converging optical systems is used for recording or reproducing of the information for respectively different information recording layers. Thus, when the recording or reproducing of the information is conducted onto each of information recording layers of the multi-layer type optical information recording medium, the aberration correction corresponding to each layer can be independently conducted, and when the recording or reproducing of the information is conducted onto the different information recording layers, an appropriate and quick recording or reproducing of the information can be conducted.

In a fifth structure of the optical pick-up apparatus of the invention, the apparatus has a selection means to select the information recording layer to be recorded or reproduced from a laminated plurality of information recording layers, and the recording or reproducing of the information is conducted on the information recording layer selected by the selection means. Thus, the recording or reproducing of the information can be appropriately conducted on each of information recording layers of the multi-layer type optical information recording medium.

In a sixth structure of the optical pick-up apparatus of the invention, the light converging optical system has at least 2 final optical elements, and each of final optical elements is used for the recording or reproducing of the information onto the respective different information recording layers, and when the selection means selects any one of the plurality of final optical elements. Because_the recording or reproducing of the information is conducted on the information recording layer corresponding to the selected final optical element, the aberration correction corresponding to each layer can be independently conducted, and the recording or reproducing of the information can be appropriately conducted on each of information recording layers of the multi-layer type optical information recording medium.

In a seventh structure of the optical pick-up apparatus of the invention, the selection means changes the wavelength of the light source corresponding to each of the laminated information recording layers for the information to be recorded or reproduced. Thus, the light converging optical system to irradiate the light onto each of the information recording layers or the detection optical system of the light reflected from that can be commonly used, and although the apparatus is a structure which is simple, and whose space saving can be intended, the appropriate and quick recording or reproducing of the information can be conducted.

In an eighth structure of the optical pick-up apparatus of the invention, the selection means is provided with at least one optical element to change the divergence degree or convergence degree of the incident light into the final optical element corresponding to each of laminated information recording layers to record or reproduce the information on the light source side of the final optical element. Thus, when the recording or reproducing of the information is conducted on each of information recording layers, the degree of freedom in the optical design work such as the aberration correction can be expanded. As an example of the optical element to change the divergence degree or convergence degree of the incident light into the final optical element, it includes a beam expander, coupling lens, or refractive index changing liquid crystal plate, but it is not limited to these elements.

In a ninth structure of the optical pick-up apparatus of the invention, the optical element to change the divergence degree or convergence degree of the incident light into the final optical element has a positive lens group having the positive refractive power and a negative lens group having the negative refractive power, and at least one lens group is displaceable movable element, and the aberration correction can be arbitrarily conducted when the recording or reproducing of the information is conducted onto each of information recording layers.

In a tenth structure of the optical pick-up apparatus of the invention, the optical element to change the divergence degree or convergence degree of the incident light into the final optical element is formed of one positive lens, and one negative lens, and because at least one of them is a displaceable and movable element, the aberration correction can be arbitrarily conducted when the recording or reproducing of the information is conducted onto each of information recording layers.

In an eleventh structure of the optical pick-up apparatus of the invention, the information recording medium includes the first recording layer and second recording layer in the order of nearer distance from the final optical element, and in a case where the recording or reproducing is conducted onto the first recording layer. Because the interval between the negative lens group and the positive lens group is increased more than a case where the recording or reproducing of the information is conducted onto the second recording layer, it can cope with a fact that it is necessary that the divergent angle of the incident light into the second recording layer is increased more than the incident light into the first recording layer.

In a twelfth structure of the optical pick-up apparatus of the invention, the optical element to change the divergence degree or convergence degree of the incident light into the final optical element corrects the spherical aberration or the axial chromatic aberration which hinders the recording or reproducing of the information, in the information recording layer to record or reproduce. Because the optical element to change the divergence degree or convergence degree of the incident light into the final optical element not only change the information recording layer to record or reproduce the information, but also charges the change of the spherical aberration generated in the final optical element on the optical recording surface of the objective layer, and correction of the axial chromatic aberration, it is not necessary that another optical element to correct these aberrations is used, and the compactness of the optical system and the cost reduction thereof can be intended.

In a thirteenth structure of the optical pick-up apparatus of the invention, the optical element to correct the variation of the spherical aberration and the axial chromatic aberration satisfies the following expression.

$$vdP > vdN \qquad (1)$$

Where vdP: the average of Abbe's number of d-line of total positive lens including the positive lens (group), vdN: the average of Abb's number of d-line of total negative lens including the negative lens (group).

The above expression (1) shows the condition relating to the correction of axial chromatic aberration. Due to the minute variation of the oscillation wavelength of the light source or the temperature and humidity change, in the case where the spherical aberration of the final optical element changes, when a means to correct this is composed of, for example, the optical element which is displaceable in the optical axis direction, such the optical element is moved by an adequate amount, and the divergence degree of the luminous flux incident to the final optical element can be changed so that the spherical aberration of the final optical element becomes minimum. However, when the materials of the positive lens and negative lens in the means to correct the variation of the spherical aberration are selected so as to satisfy the expression (1), the chromatic aberration having the reversal polarity to the chromatic aberration generated in the final optical element can be generated. Accordingly, the axial chromatic aberrations are cancelled with each other, and the wave front which transmits the means to correct the variation of the spherical aberration and the final optical element, and is focused onto the optical information recording medium, is in a condition that the axial chromatic aberration is suppressed small.

In a fourteenth structure of the optical pick-up apparatus of the invention, the vdP and the vdN satisfy the following expressions.

$$vdP > 55 \qquad (2)$$

$$vdN < 35 \qquad (3)$$

When the difference between Abbe's numbers of the positive lens and the negative lens is increased, because the chromatic aberration of the reversal polarity to the final optical element can be generated larger, the axial chromatic aberration of the optical information recording and reproducing optical system can be corrected better.

In a fifteenth structure of the optical pick-up apparatus of the invention, the optical element to vary the divergence degree or convergence degree of the incident light to the final optical element can change the refractive index distribution. Thus, the recording or reproducing of the information can be conducted more adequately onto each of information recording layers. Herein, as the element which can change the refractive index, the refractive index change liquid crystal plate is so referred, but it is not limited to this.

In a sixteenth structure of the optical pick-up apparatus of the invention, at least one optical element which structures the light converging optical system, has at least one aspherical optical surface, by using such the aspherical optical surface. Thus, the spherical aberration generated in the optical system can be corrected.

In a seventeenth structure of the optical pick-up apparatus of the invention, at least one optical element which structures the light converging optical system, is provided with the diffraction surface having the ring band-like diffraction structure. Because, by using such the diffraction surface, the axial chromatic aberration can be effectively corrected, it is not necessary that the optical element for the axial chromatic aberration correction is newly provided, and the low cost and space saving is possible. In this connection, for the optical element having the diffraction surface, in the case where the optical system is structured by a plurality of lenses, one lens is included, and particularly, when the optical system is structured by the positive lens or negative lens, it includes one of them. Further, it also includes the optical element which is separately provided other than these lenses.

In an eighteenth-structure of the optical pick-up apparatus of the invention, at least one optical system constituting the light converging optical system is formed of a material whose specific gravity is not larger than 2.0. Thus, the weight reduction can be intended, and the burden onto the displacing apparatus such as the focusing apparatus can be lightened.

In a nineteenth structure of the optical pick-up apparatus of the invention, at least one optical element constituting the light converging optical system is formed of a plastic material. Thus, the weight reduction can be attained, and while lightening the burden onto the displacing apparatus such as the focusing apparatus, the processing such as the formation of the diffraction structure or aspheric surface can be easily conducted.

In a twentieth structure of the optical pick-up apparatus of the invention, at least one optical element constituting the light converging optical system is formed of a material whose saturation water absorption is not larger than 0.5%. Thus, the deterioration of the performance at the time of humidity change can be suppressed.

In a twenty first structure of the optical pick-up apparatus of the invention, at least one optical element constituting the light converging optical system is formed of a material whose internal transmissivity is not smaller than 85% at the thickness of 3 mm to the light of the oscillation wavelength of the light source. Thus, the using efficiency of the incident light can be in creased.

In a twenty second structure of the optical pick-up apparatus of the invention, the light converging optical system has at least 2 apertures to regulate the image side numerical aperture in a plurality of information recording layers of the optical information recording medium. Thus, it can change the aperture sop to regulate the information recording light for each of information layers to be recorded or reproduced, and the image formation at a predetermined image side numerical aperture (NA) can be conducted in each of information recording layers.

In a twenty third structure of the optical pick-up apparatus of the invention, at least one of the apertures is placed between the final optical element and the information recording medium. For example, when the final optical element is a catadioptric, the final surface can be divided into the mirror surface portion and the transmission portion to transmit the converging light. In such the case, when the transmission portion is made a minute opening and simultaneously the role of the aperture is made to be performed, the using efficiency of the incident light can be increased, and the low cost, size reduction, and weight reduction can be intended.

In a twenty fourth structure of the optical pick-up apparatus of the invention, at least one optical element of the optical system is formed by etching. Thus, the minute optical element can be accurately molded.

A twenty fifth structure of the optical pick-up apparatus of the invention has the light source, and the light converging optical system to light converge the luminous flux emitted from the light source onto any one information recording layer of the optical information recording medium having a laminated plurality of information recording layers, and in the optical pick-up apparatus by which the recording and/or reproducing of the information is conducted onto the optical information recording medium, the light converging optical system has the final optical element opposite to the optical information recording medium, spacing a smaller interval than the wavelength of the light source, and when the light converging optical system light converges the luminous flux whose image side numerical aperture is not smaller than 1.0, because the recording or reproducing of the information is conducted onto the information recording layer, the high density optical information recording or reproducing can be conducted onto the optical information recording medium, in the same manner as in the first structure of the optical pick-up apparatus. Further, because the air layer can be provided between the optical information recording medium and the final optical element, the optical information recording medium can be made, for example, to a circular rotating disk such as a CD, and the recording and/or reproducing of the information can be conducted at the higher speed, and the optical information recording medium can be made to a removable one with excellent handling.

A twenty sixth structure of the optical pick-up apparatus of the invention is characterized in that the light converging optical system has the final optical element opposed to the optical information recording medium, and the final optical surface of the final optical element is approximate to the surface of the optical information recording medium spacing the distance not larger than one fourth of the wavelength of the light source. The effect of such the invention is the same as in the third structure of the optical pick-up apparatus.

A twenty seventh structure of the optical pick-up apparatus of the invention is characterized in that the light converging optical systems are provided plural numbers, and each of the light converging optical systems is used for recording or reproducing of the information onto the respectively different information recording layers. The effect of such the invention is the same as in the fourth structure of the optical pick-up apparatus.

A twenty eighth structure of the optical pick-up apparatus of the invention is characterized in that it has the selection means to select the information recording layers to be recorded or reproduced, and the information is recorded or reproduced onto the information recording layers selected by the selection means. The effect of such the invention is the same as in the fifth structure of the optical pick-up apparatus.

A twenty ninth structure of the optical pick-up apparatus of the invention is characterized in that the light converging optical system has at least 2 final optical elements, and each final optical element is used for the recording or reproducing of the information onto the respectively different information recording layers, and when the selection means selects any one of the plurality of final optical elements, the recording or reproducing of the information is conducted onto the information recording layer corresponding to the selected final optical element. The effect of such the invention is the same as in the sixth structure of the optical pick-up apparatus.

A thirtieth structure of the optical pick-up apparatus of the invention is characterized in that the selection means changes the wavelength of the light source corresponding to each of laminated information recording layers for the information to be recorded or reproduced. The effect of such the invention is the same as in the seventh structure of the optical pick-up apparatus.

A thirty first structure of the optical pick-up apparatus of the invention is characterized in that the selection means provides at least one optical element by which the divergence degree or convergence degree of the incident light into the final optical element is varied corresponding to each of laminated information recording layers for the information to be recorded or reproduced, on the light source side of the final optical element. The effect of such the invention is the same as in the eighth structure of the optical pick-up apparatus.

A thirty second structure of the optical pick-up apparatus of the invention is characterized in that the optical element to vary the divergence degree or convergence degree of the incident light into the final optical element has the positive lens group having the positive refractive power and the negative lens group having the negative refractive power, and at least one lens group of them is a displaceable movable element. The effect of such the invention is the same as in the ninth structure of the optical pick-up apparatus.

A thirty third structure of the optical pick-up apparatus of the invention is characterized in that the optical element to vary the divergence degree or convergence degree of the incident light into the final optical element is composed of a positive lens and a negative lens, and at least one lens of them is a displaceable movable element. The effect of such the invention is the same as in the tenth structure of the optical pick-up apparatus.

A thirty fourth structure of the optical pick-up apparatus of the invention is characterized in that the information recording medium includes the first recording layer and the second recording layer in the order of the distance nearer to the final optical element, and when the recording or reproducing is conducted onto the first recording layer, the distance between the negative lens group and the positive lens group or the distance between the negative lens and the positive lens is more increased than the case where the recording or reproducing of the information is conducted onto the second recording layer. The effect of such the invention is the same as in the eleventh structure of the optical pick-up apparatus.

A thirty fifth structure of the optical pick-up apparatus of the invention is characterized in that the optical element to vary the divergent degree or the convergent degree of the incident light into the final optical element corrects the spherical aberration or axial chromatic aberration which hinders the recording or reproducing of the information, in the information recording layer to be recorded or reproduced. The effect of such the invention is the same as in the twelfth structure of the optical pick-up apparatus.

A thirty sixth structure of the optical pick-up apparatus of the invention is characterized in that the optical element to correct the variation of the spherical aberration and the axial chromatic aberration satisfy the following expression.

$$vdP > vdN \tag{1}$$

Where, vdP: the average of Abbe's number of d line of the all positive lenses including the positive lens (group), and vdN: the average of Abbe's number of d line of the all negative lenses including the negative lens (group). The effect of such the invention is the same as in the thirteenth structure of the optical pick-up apparatus.

A thirty seventh structure of the optical pick-up apparatus of the invention is characterized in that the vdP and the vdN satisfy the following expression.

$$vdP > 55 \tag{2}$$

$$vdN < 35 \tag{3}$$

The effect of such the invention is the same as in the fourteenth structure of the optical pick-up apparatus.

A thirty eighth of the optical pick-up apparatus of the invention is characterized in that the optical element to vary the divergent degree or convergent degree of the incident light into the final optical element can change the refractive index. The effect of such the invention is the same as in the fifteenth structure of the optical pick-up apparatus.

A thirty ninth structure of the optical pick-up apparatus of the invention is characterized in that at least one optical element constituting the light converging optical system has at least one aspherical optical surface. The effect of such the invention is the same as in the sixteenth structure of the optical pick-up apparatus.

A fortieth structure of the optical pick-up apparatus of the invention is characterized in that at least one optical element constituting the light converging optical system has the diffraction surface having the ring band-like diffraction structure. The effect of such the invention is the same as in the seventeenth structure of the optical pick-up apparatus.

A forty first structure of the optical pick-up apparatus of the invention is characterized in that at least one optical element constituting the light converging optical system is formed of the material whose specific gravity is not larger than 2.0. The effect of such the invention is the same as in the eighteenth structure of the optical pick-up apparatus.

A forty second structure of the optical pick-up apparatus of the invention is characterized in that at least one optical element constituting the light converging optical system is formed of the plastic material. The effect of such the invention is the same as in the nineteenth structure of the optical pick-up apparatus.

A forty third structure of the optical pick-up apparatus of the invention is characterized in that at least one optical element constituting the light converging optical system is formed of the material whose saturation water absorption is not larger than 0.5%. The effect of such the invention is the same as in the twentieth structure of the optical pick-up apparatus.

A forty fourth structure of the optical pick-up apparatus of the invention is characterized in that at least one optical element constituting the light converging optical system is formed of the material whose internal transimissivity is not smaller than 85% in the thickness of 3 mm to the light of the oscillation wavelength of the light source. The effect of such the invention is the same as in the twenty first structure of the optical pick-up apparatus.

A forty fifth structure of the optical pick-up apparatus of the invention is characterized in that the light converging optical system has at least 2 apertures to regulate the image side numerical aperture in a plurality of information recording layers of the optical information recording medium. The effect of such the invention is the same as in the twenty second structure of the optical pick-up apparatus.

A forty sixth structure of the optical pick-up apparatus of the invention is characterized in that at least one of the apertures is positioned between the final optical element and the optical information recording medium. The effect of such the invention is the same as in the twenty third structure of the optical pick-up apparatus.

A forty seventh structure of the optical pick-up apparatus of the invention is characterized in that at least one of optical element of the light converging optical system is formed by the etching. The effect of such the invention is the same as in the twenty fourth structure of the optical pick-up apparatus.

In a forty eighth structure of the optical pick-up apparatus of the invention which has a light source, and a light converging optical system to converge the light onto any one information recording layer of the optical information recording medium having a laminated plurality of information recording layers, and in which the recording and/or reproducing of the information is conducted onto the optical information recording medium, the optical pick-up apparatus is characterized in that the optical information recording medium has a transparent substrate whose thickness is larger than the wavelength of the light source, and the light converging optical system has a final optical element opposite to the optical information recording medium spacing the distance smaller than the wavelength of the light source, and when the light converging optical system converges the luminous flux whose image side numerical aperture is larger than 1.0 onto the information recording layer through the transparent substrate, the recording or reproducing of the information is conducted onto the information recording layer.

One problem in the case where the near field effect is used, is that it is necessary that the distance between the final optical element and the optical information recording medium is set smaller than the wavelength of the using wavelength. However, in the case of the removable recording medium, considering the influence of flaw when the user handles it, or dust, it is common that the protective layer is provided on the information recording surface. The thickness of the protective layer is, in many cases, more than the wavelength of the light source used.

Therefore, in the present invention, using the near field effect of wide sense, it is considered that the recording or reproducing is conducted. When more specifically described, as described above, the evanescent light has the characteristic that it exponential functionally attenuates as it is separated from the final optical element, and when the transparent substrate (TP in FIG. 1) is placed in its light path, the evanescent light incident to that place, becomes again the propagation light, and has the characteristic that it propagates in the transparent substrate as the normal light. It is called the near field effect in the wide sense. In the present invention, using such the characteristic, when the evanescent light emitted from the final optical element is received by the transparent substrate and made to a propagation light, the recording or reproducing of the information can be conducted also onto the information recording layer which is remote from the final optical surface of the final optical element more than the wavelength of the light source. In this connection, in the optical information recording medium, in many cases, the transparent protective layer covering the information recording surface is provided, and such the protective layer can perform the function as the transparent substrate of the present invention. Accordingly, the interval Δ between the final optical element and the surface of the protective layer of the optical information recording medium may be smaller than the wavelength of the in formation recording light. Herein, when the layer can transmit the light, the transparent substrate may not be colored or plate-like one.

A forty ninth structure of the optical pick-up apparatus of the invention is characterized in that the final optical surface of the final optical element is approximate to the surface of the optical information recording medium spacing with the distance smaller than one fourth of the wavelength of the light source. The effect of such the invention is the same as in the third structure of the optical pick-up apparatus.

A fiftieth structure of the optical pick-up apparatus of the invention is characterized in that a plurality of light converging optical systems are provided, and each of light converging optical systems is used for the recording or reproducing of the information onto the respectively different information recording layers. The effect of such the invention is the same as in the fourth structure of the optical pick-up apparatus.

A fifty first structure of the optical pick-up apparatus of the invention is characterized in that the apparatus has a selection means for selecting the information recording layer to be recorded or reproduced from the laminated plurality of plurality of information recording layers, and the recording or reproducing of the information is conducted onto the information recording layer selected by the selection means. The effect of such the invention is the same as in the fifth structure of the optical pick-up apparatus.

A fifty second structure of the optical pick-up apparatus of the invention is characterized in that the light converging optical system has at least 2 final optical elements, and each of final optical elements is used for the recording or reproducing of the information onto the respectively different information recording layers, and when the selection means selects any one of final optical elements, the recording or reproducing of the information is conducted onto the information recording layer corresponding to the selected final optical element. The effect of such the invention is the same as in the sixth structure of the optical pick-up apparatus.

A fifty third structure of the optical pick-up apparatus of the invention is characterized in that the selection means changes the wavelength of the light source corresponding to each of laminated information recording layers for the information to be recorded and reproduced. The effect of such the invention is the same as in the seventh structure of the optical pick-up apparatus.

A fifty fourth structure of the optical pick-up apparatus of the invention is characterized in that at least one optical element to vary the divergence degree or convergence degree of the incident light into the final optical element, corresponding to each of laminated information recording layers for the information to be recorded and reproduced, is provided on the light source side of the final optical element. The effect of such the invention is the same as in the eighth structure of the optical pickup apparatus.

A fifty fifth structure of the optical pick-up apparatus of the invention is characterized in that the optical element to vary the divergence degree or convergence degree of the incident light into the final optical element has the positive lens group having the positive refractive power and the negative lens group having the negative refractive power, and at least one lens group of them is a displaceable movable element. The effect of such the invention is the same as in the ninth structure of the optical pick-up apparatus.

A fifty sixth structure of the optical pick-up apparatus of the invention is characterized in that the optical element to vary the divergence degree or convergence degree of the incident light into the final optical element is composed of one positive lens and one negative lens, and at least one of them is a displaceable movable element. The effect of such the invention is the same as in the tenth structure of the optical pick-up apparatus.

A fifty seventh structure of the optical pick-up apparatus of the invention is characterized in that the information recording medium includes the first recording layer and the second recording layer in the order of the distance nearer to the final optical element, and when the recording or reproducing of the information is conducted onto the first recording layer, the interval between the negative lens group and the positive lens group or the distance between the positive lens and the negative lens is more increased than the case where the recording or reproducing of the information is conducted onto the second recording layer. The effect of such the invention is the same as in the eleventh structure of the optical pick-up apparatus.

A fifty eighth structure of the optical pick-up apparatus of the invention is characterized in that the optical element to vary the divergence degree or convergence degree of the incident light into the final optical element corrects the spherical aberration or the axial chromatic aberration which hinders the recording or reproducing of the information, in the information recording layer to be recorded or reproduced. The effect of such the invention is the same as in the twelfth structure of the optical pick-up apparatus.

A fifty ninth structure of the optical pick-up apparatus of the invention is characterized in that the optical element to correct the variation of the spherical aberration and the axial chromatic aberration satisfies the following expression.

$$vdP > vdN \quad (1)$$

where, vdP: the average of Abbe's number of d line of all positive lens including the positive lens (group), vdN: the average of Abbe's number of d line of all negative lens including the negative lens (group). The effect of such the invention is the same as in the thirteenth structure of the optical pick-up apparatus.

A sixtieth structure of the optical pick-up apparatus of the invention is characterized in that the value vdP and the value vdN satisfy the following expressions.

$$vdP > 55 \quad (2)$$

$$vdN < 35 \quad (3)$$

The effect of such the invention is the same as in the fourteenth structure of the optical pick-up apparatus.

A sixty first structure of the optical pick-up apparatus of the invention is characterized in that the optical element to vary the divergence degree or convergence degree of the incident light into the final optical element can changes the refractive index distribution. The effect of such the invention is the same as in the fifteenth structure of the optical pick-up apparatus.

A sixty second structure of the optical pick-up apparatus of the invention is characterized in that at least one optical element constituting the light converging optical system has at least one aspherical optical surface. The effect of such the invention is the same as in the sixteenth structure of the optical pick-up apparatus.

A sixty third structure of the optical pick-up apparatus of the invention is characterized in that at least one optical element constituting the light converging optical system has a diffraction surface having the ring band-like diffraction structure. The effect of such the invention is the same as in the seventeenth structure of the optical pick-up apparatus.

A sixty fourth structure of the optical pick-up apparatus of the invention is characterized in that at least one optical element constituting the light converging optical system is formed of the material whose specific gravity is not larger than 2.0. The effect of such the invention is the same as in the eighteenth structure of the optical pick-up apparatus.

A sixty fifth structure of the optical pick-up apparatus of the invention is characterized in that at least one optical element constituting the light converging optical system is formed of a plastic material. The effect of such the invention is the same as in the nineteenth structure of the optical pick-up apparatus.

A sixty sixth structure of the optical pick-up apparatus of the invention is characterized in that at least one optical element constituting the light converging optical system is formed of a material whose saturation water absorption is not larger than 0.5%. The effect of such the invention is the same as in the twentieth structure of the optical pick-up apparatus.

A sixty seventh structure of the optical pick-up apparatus of the invention is characterized in that at least one optical element constituting the light converging optical system is formed of a material whose internal transmissivity at the thickness of 3 mm to the light of oscillation wavelength of the light source is not smaller than 85%. The effect of such the invention is the same as in the twenty first structure of the optical pick-up apparatus.

A sixty eighth structure of the optical pick-up apparatus of the invention is characterized in that the light converging optical system has at least 2 diaphragms to regulate the image side numerical aperture in a plurality of information recording layers of the optical information recording medium. The effect of such the invention is the same as in the twenty second structure of the optical pick-up apparatus.

A sixty ninth structure of the optical pick-up apparatus of the invention is characterized in that at least one of the diaphragms is positioned between the final optical element and the optical information recording medium. The effect of such the invention is the same as the twenty third structure of the optical pick-up apparatus.

A seventieth structure of the optical pick-up apparatus of the invention is characterized in that at least one optical element of the light converging optical system is formed by etching. The effect of such the invention is the same as in the twenty fourth structure of the optical pick-up apparatus.

In a seventy first structure of the optical pick-up apparatus of the invention which has the light source and the light converging optical system to light converge the luminous flux emitted from the light source onto any one of information recording layers of the optical information recording medium having a laminated plurality of information recording layers, and by which the recording and/or reproducing of the information is conducted onto the optical information recording medium, because the optical element changes the information recording layer for the information to be recorded or reproduced is provided between the light source and the final optical element of the light converging optical system, the information recording light can be adequately irradiated onto each of information recording layers of the multi-layer type optical information recording medium by the simple and low cost structure.

A seventy second structure of the optical pick-up apparatus of the invention is characterized in that the optical element to change the information recording layers onto which the information is to be recorded or reproduced changes the divergence degree or convergence degree of the incident light into the final optical element. The effect of such the invention is the same as in the eighth structure of the optical pick-up apparatus.

A seventy third structure of the optical pick-up apparatus of the invention is characterized in that the optical element by which the divergence degree or convergence degree of the incident light into the final optical element is changed, has the positive lens group having the positive refractive power and the negative lens group having the negative refractive power, and at least one lens group of them is a displaceable movable element. The effect of such the invention is the same as in the ninth structure of the optical pick-up apparatus.

A seventy fourth structure of the optical pick-up apparatus of the invention is characterized in that the optical element to vary the divergent degree or convergence degree of the incident light into the final optical element is composed of one positive lense and one negative lense, and at least one of them is a displaceable movable element. The effect of such the invention is the same as in the tenth structure of the optical pick-up apparatus.

A seventy fifth structure of the optical pick-up apparatus of the invention is characterized in that the information recording medium includes the first recording layer and the second recording layer in the order of the distance nearer from the final optical element, and when the recording or reproducing is conducted onto the first recording layer, the interval between the negative lens group and the positive lens group or the interval between the negative lens and the positive lens is more increased than the case where the recording or reproducing of the information is conducted onto the second recording layer. The effect of such the invention is the same as in the eleventh structure of the optical pick-up apparatus.

A seventy sixth structure of the optical pick-up apparatus of the invention is characterized in that the optical element to vary the divergence degree or convergence degree of the incident light into the final optical element corrects the spherical aberration or axial chromatic aberration which hinders the recording or reproducing of the information in the information recording layer onto which the recording or reproducing is to be conducted. The effect of such the invention is the same as in the twelfth structure of the optical pick-up apparatus.

A seventy seventh structure of the optical pick-up apparatus of the invention is characterized in that the optical element which corrects the spherical aberration and axial chromatic aberration satisfies the following expression.

$$vdP > vdN \quad (1)$$

Where, vdP: the average of Abbe's number of the d line of all positive lenses including the positive lens (group), vdN: the average of Abbe's number of the d line of all negative lenses including the negative lens (group). The effect of such the invention is the same as in the thirteenth structure of the optical pick-up apparatus.

A seventy eighth structure of the optical pick-up apparatus of the invention is characterized in that the vdP and the vdN satisfy the following expressions.

$$vdP > 55 \quad (2)$$

$$vdN < 35 \quad (3)$$

The effect of such the invention is the same as in the fourteenth structure of the optical pick-up apparatus.

A seventy ninth structure of the optical pick-up apparatus of the invention is characterized in that the optical element to vary the divergence degree and the convergence degree of the incident light into the final optical element can change the refractive index distribution. The effect of such the invention is the same as in the fifteenth structure of the optical pick-up apparatus.

An eightieth structure of the optical pick-up apparatus of the invention is characterized in that at least one optical element constituting the light converging optical system has at least one aspherical optical surface. The effect of such the invention is the same as in the sixteenth structure of the optical pick-up apparatus.

An eighty first structure of the optical pick-up apparatus of the invention is characterized in that at least one optical element constituting the light converging optical system has the diffraction surface having the ring band-like diffraction structure. The effect of such the invention is the same as in the seventeenth structure of the optical pick-up apparatus.

An eighty second structure of the optical pick-up apparatus of the invention is characterized in that at least one optical element constituting the light converging optical system is formed of the material whose specific gravity is not larger than 2.0. The effect of such the invention is the same as in the eighteenth structure of the optical pick-up apparatus.

An eighty third structure of the optical, pick-up apparatus of the invention is characterized in that at least one optical element constituting the light converging optical system is formed of the plastic material. The effect of such the invention is the same as in the nineteenth structure of the optical pick-up apparatus.

An eighty fourth structure of the optical pick-up apparatus of the invention is characterized in that at least one optical element constituting the light converging optical system is formed of the material whose saturation water absorption is not larger than 0.5%. The effect of such the invention is the same as in the twentieth structure of the optical pick-up apparatus.

An eighty fifth structure of the optical pick-up apparatus of the invention is characterized in that at least one optical element constituting the light converging optical system is formed of the material whose internal transmissivity at the 3 mm thickness to the light of oscillation wavelength of the light source is not smaller than 85%. The effect of such the invention is the same as in the twenty first structure of the optical pick-up apparatus.

An eighty sixth structure of the optical pick-up apparatus of the invention is characterized in that the light converging optical system has at least 2 diaphragms to regulate the image side numerical aperture in a plurality of information recording layers of the optical information recording medium. The effect of such the invention is the same as in the twenty second structure of the optical pick-up apparatus.

An eighty seventh structure of the optical pick-up apparatus of the invention is characterized in that at least one diaphragm of the diaphragms is positioned between the final optical element and the optical information recording medium. The effect of such the invention is the same as in the twenty third structure of the optical pick-up apparatus.

An eighty eighth structure of the optical pick-up apparatus of the invention is characterized in that at least one optical element of the light converging optical system is formed by etching. The effect of such the invention is the same as in the twenty fourth structure of the optical pick-up apparatus.

In an eighty ninth structure of the light converging optical system of the optical pick-up apparatus of the invention which has the light source and the light converging optical system to light converge the luminous flux emitted from the light source onto any one of information recording layers of the optical information recording medium having a laminated plurality of information recording layers, and by which the recording and/or reproducing of the information is conducted onto the optical information recording medium, the light converging optical system is characterized in that, when the light converging optical system light converges the luminous flux whose image side numerical aperture is not smaller than 1.0, onto the information recording layer, the recording or reproducing of the information is conducted onto the information recording layer. The effect of such the invention is the same as in the first structure of the optical pick-up apparatus.

A ninetieth structure of the light converging optical system of the invention is characterized in that it has the final optical element opposite to the optical information recording medium, and the final optical surface of the final optical element is in contact with the surface of the optical information recording medium. The effect of such the invention is the same as in the second structure of the optical pick-up apparatus.

A ninety first structure of the light converging optical system of the invention is characterized in that it has the final optical element opposite to the optical information recording medium, and the final optical surface of the final optical element is approximate to the surface of the optical information recording medium spacing the interval not larger than one fourth of the wavelength of the light source. The effect of such the invention is the same as in the third structure of the optical pick-up apparatus.

A ninety second structure of the light converging optical system of the invention is characterized in that a plurality of light converging optical systems are provided, and each of light converging systems is used for the recording or reproducing of the information onto the respectively different information recording layers. The effect of such the invention is the same as in the fourth structure of the optical pick-up apparatus.

A ninety third structure of the light converging optical system of the invention is characterized in that it has a selection means for selecting the information recording layer onto which the recording or reproducing is to be conducted, from a laminated plurality of information recording layers, and the recording or reproducing of the information is conducted onto the information recording layer selected by the selection means. The effect of such the invention is the same as in the fifth structure of the optical pick-up apparatus.

A ninety fourth structure of the light converging optical system of the invention is characterized in that the light converging optical system has at least 2 final optical elements, and each of the final optical elements is used for the recording or reproducing of the information onto the respectively different information recording layers, and when the selection means selects any one of the plurality of final optical elements, the recording or reproducing of the information is conducted onto the information recording layer corresponding to the selected final optical element. The effect of such the invention is the same as in the sixth structure of the optical pick-up apparatus.

A ninety fifth structure of the light converging optical system of the invention is characterized in that the selection means changes the wavelength of the light source corresponding to each of laminated information recording layers onto which the recording or reproducing of the information is to be conducted. The effect of such the invention is the same as in the seventh structure of the optical pick-up apparatus.

A ninety sixth structure of the light converging optical system of the invention is characterized in that the selection means provides at least one optical element to vary the divergence degree or convergence degree of the incident light into the final optical element on the light source side of the final optical element, corresponding to each of laminated information recording layers onto which the recording or reproducing of the information is to be conducted. The effect of such the invention is the same as in the eighth structure of the optical pick-up apparatus.

A ninety seventh structure of the light converging optical system of the invention is characterized in that the optical element to vary the divergence degree or convergence degree of the incident light into the final optical element, has the positive lens group having the positive refractive power and the negative lens group having the negative refractive power, and at least one lens group of them is a displaceable movable element. The effect of such the invention is the same as in the ninth structure of the optical pick-up apparatus.

A ninety eighth structure of the light converging optical system of the invention is characterized in that the optical element to vary the divergence degree or convergence degree of the incident light into the final optical element, is composed of one positive lens and one negative lens, and at least one of them is a displaceable movable element. The effect of such the invention is the same as in the tenth structure of the optical pick-up apparatus.

A ninety ninth structure of the light converging optical system of the invention is characterized in that the information recording medium includes the first recording layer and the second recording layer in the order of the distance nearer from the final optical element, and when the recording or reproducing is conducted onto the first recording layer, the interval between the negative lens group and the positive lens group or the interval between the negative lens and the positive lens is more increased than the case where the recording or reproducing of the information is conducted onto the second recording layer. The effect of such the invention is the same as in the eleventh structure of the optical pick-up apparatus.

A one hundredth structure of the light converging optical system of the invention is characterized in that the optical element to vary the divergence degree or convergence degree of the incident light into the final optical element, corrects the spherical aberration or axial chromatic aberration which hinders the recording or reproducing of the information, in the information recording layer onto which the recording or reproducing is to be conducted. The effect of such the invention is the same as in the twelfth structure of the optical pick-up apparatus.

A one hundred first structure of the light converging optical system of the invention is characterized in that the optical element to correct the variation of the spherical aberration and the axial chromatic aberration satisfies the following expression.

$$vdP > vdN \qquad (1)$$

Where, vdP: the average of Abbe's number of the d line of all positive lenses including the positive lens (group), vdN:

the average of Abbe's number of the d line of all negative lenses including the negative lens group). The effect of such the invention is the same as in the thirteenth structure of the optical pick-up apparatus.

A one hundred second structure of the light converging optical system of the invention is characterized in that the vdP and the vdN satisfy the following expressions.

$$vdP>55 \quad (2)$$

$$vdN<35 \quad (3)$$

The effect of such the invention is the same as in the fourteenth structure of the optical pick-up apparatus.

A one hundred third structure of the light converging optical system of the invention is characterized in that the optical element to vary the divergence degree or convergence degree of the incident light into the final optical element can change the refractive index distribution. The effect of such the invention is the same as in the fifteenth structure of the optical pick-up apparatus.

A one hundred fourth structure of the light converging optical system of the invention is characterized in that at least one optical element constituting the light converging optical system has at least one aspherical optical surface. The effect of such the invention is the same as in the sixteenth structure of the optical pick-up apparatus.

A one hundred fifth structure of the light converging optical system of the invention is characterized in that at least one optical element constituting the light converging optical system has a diffraction surface having a ring band-like diffraction structure. The effect of such the invention is the same as in the seventeenth structure of the optical pick-up apparatus.

A one hundred sixth structure of the light converging optical system of the invention is characterized in that at least one optical element constituting the light converging optical system is formed of the material whose specific gravity is not larger than 2.0. The effect of such the invention is the same as in the eighteenth structure of the optical pick-up apparatus.

A one hundred seventh structure of the light converging optical system of the invention is characterized in that at least one optical element constituting the light converging optical system is formed of the plastic material. The effect of such the invention is the same as in the nineteenth structure of the optical pick-up apparatus.

A one hundred eighth structure of the light converging optical system of the invention is characterized in that at least one optical element constituting the light converging optical system is formed of the material whose saturation water absorption is not larger than 0.5%. The effect of such the invention is the same as in the twentieth structure of the optical pick-up apparatus.

A one hundred ninth structure of the light converging optical system of the invention is characterized in that at least one optical element constituting the light converging optical system is formed of the material whose internal transmissivity at the 3 mm thickness to the light of the oscillation wavelength of the light source is not smaller than 85%. The effect of such the invention is the same as in the twenty first structure of the optical pick-up apparatus.

A one hundred tenth structure of the light converging optical system of the invention is characterized in that the light converging optical system has at least 2 diaphragms to regulate the image side numerical aperture in a plurality of information recording layers of the optical information recording medium. The effect of such the invention is the same as in the twenty second structure of the optical pick-up apparatus.

A one hundred eleventh structure of the light converging optical system of the invention is characterized in that at least one of diaphragms is positioned between the final optical element and the optical information recording medium. The effect of such the invention is the same as in the twenty third structure of the optical pick-up apparatus.

A one hundred twelfth structure of the light converging optical system of the invention is characterized in that at least one optical element of the light converging optical system is formed by etching. The effect of such the invention is the same as in the twenty fourth structure of the optical pick-up apparatus.

In a one hundred thirteenth structure of the light converging optical system of the optical pick-up apparatus of invention which has the light source and the light converging optical system to light converge the luminous flux emitted from the light source onto any one of information recording layers of the optical information recording medium having a laminated plurality of information recording layers, and by which the recording and/or reproducing of the information is conducted onto the optical information recording medium, the light converging optical system is characterized in that, it has the final optical element opposite to the optical information recording medium spacing the distance not larger than the wavelength of the light source, and when the light converging optical system light converges the luminous flux whose image side numerical aperture is not smaller than 1.0, onto the information recording layer, the recording or reproducing of the information is conducted onto the information recording layer. The effect of such the invention is the same as in the twenty fifth structure of the optical pick-up apparatus.

A one hundred fourteenth structure of the light converging optical system of the invention is characterized in that it has the final optical element opposite to the optical information recording medium, and the final optical surface of the final optical element is approximate to the surface of the optical information recording medium spacing the distance not larger than one fourth of the wavelength of the light source. The effect of such the invention is the same as in the third structure of the optical pick-up apparatus.

A one hundred fifteenth structure of the light converging optical system of the invention is characterized in that a plurality of light converging elements are provided, and each of light converging elements is used for the recording or reproducing of the information onto the respectively different information recording layers. The effect of such the invention is the same as in the fourth structure of the optical pick-up apparatus.

A one hundred sixteenth structure of the light converging optical system of the invention is characterized in that it has a selection means for selecting the information recording layer onto which the recording or reproducing is to be conducted, from the laminated plurality of information recording layers, and the recording or reproducing of the information is conducted onto the information recording layer selected by the selection means. The effect of such the invention is the same as in the fifth structure of the optical pick-up apparatus.

A one hundred seventeenth structure of the light converging optical system of the invention is characterized in that it has at least 2 final optical element and each of the final optical elements is used for the recording or reproducing of the information onto the respectively different information recording layers, and when the selection means selects any one of the plurality of final optical elements, the recording or reproducing of the information is conducted onto the information recording layer corresponding to the selected final optical element. The effect of such the invention is the same as in the sixth structure of the optical pick-up apparatus.

A one hundred eighteenth structure of the light converging optical system of the invention is characterized in that the selection means changes the wavelength of the light source corresponding to each of information recording layers onto which the recording and reproducing of the information is to be conducted. The effect of such the invention is the same as in the seventh structure of the optical pick-up apparatus.

A one hundred nineteenth structure of the light converging optical system of the invention is characterized in that the selection means is provided with, corresponding to each of laminated information recording layers onto which the recording or reproducing of the information to be conducted, at least one optical element to vary the divergence degree or convergence degree of the incident light into the final optical element on the light source side of the final optical element. The effect of such the invention is the same as in the eighth structure of the optical pick-up apparatus.

A one hundred twentieth structure of the light converging optical system of the invention is characterized in that the optical element to vary the divergence degree or convergence degree of the incident light into the final optical element, has the positive lens group having the positive refractive power and the negative lens group having the negative refractive power, and at least one lens group of them is a displaceable movable element. The effect of such the invention is the same as in the ninth structure of the optical pick-up apparatus.

A one hundred twenty first structure of the light converging optical system of the invention is characterized in that the optical element to vary the divergence degree or convergence degree of the incident light into the final optical element, is composed of one positive lens and one negative lens, and at least one of them is a displaceable movable element. The effect of such the invention is the same as in the tenth structure of the optical pick-up apparatus.

A one hundred twenty second structure of the light converging optical system of the invention is characterized in that the information recording medium includes the first recording layer and the second recording layer in the order of the distance nearer from the final optical element, and when the recording or reproducing is conducted onto the first recording layer, the interval between the negative lens group and the positive lens group or the interval between the negative lens and the positive lens is more increased than the case where the recording or reproducing of the information is conducted onto the second recording layer. The effect of such the invention is the same as in the eleventh structure of the optical pick-up apparatus.

A one hundred twenty third structure of the light converging optical system of the invention is characterized in that the optical element to vary the divergence degree or convergence degree of the incident light into the final optical element, corrects the spherical aberration or axial chromatic aberration which hinders the recording or reproducing of the information, in the information recording layer onto which the recording or reproducing is to be conducted. The effect of such the invention is the same as in the twelfth structure of the optical pick-up apparatus.

A one hundred twenty fourth structure of the light converging optical system of the invention is characterized in that the optical element to correct the variation of the spherical aberration and the axial chromatic aberration satisfies the following expression.

$$vdP > vdN \quad (1)$$

Where, vdP: the average of Abbe's number of the d line of all positive lenses including the positive lens (group), vdN: the average of Abbe's number of the d line of all negative lenses including the negative lens (group). The effect of such the invention is the same as in the thirteenth structure of the optical pick-up apparatus.

A one hundred twenty fifth structure of the light converging optical system of the invention_is characterized in that the vdP and the vdN satisfy the following expressions.

$$vdP > 55 \quad (2)$$

$$vdN < 35 \quad (3)$$

The effect of such the invention is the same as in the fourteenth structure of the optical pick-up apparatus.

A one hundred twenty sixth structure of the light converging optical system of the invention is characterized in that the optical element to vary the divergence degree or convergence degree of the incident light into the final optical element can change the refractive index distribution. The effect of such the invention is the same as in fifteenth structure of the optical pick-up apparatus.

A one hundred twenty seventh structure of the light converging optical system of the invention is characterized in that at least one optical element constituting the light converging optical system has at least one aspherical optical surface. The effect of such the invention is the same as in the sixteenth structure of the optical pick-up apparatus.

A one hundred twenty eighth structure of the light converging optical system of the invention is characterized in that at least one optical element constituting the light converging optical system has a diffraction surface having a ring band-like diffraction structure. The effect of such the invention is the same as in the seventeenth structure of the optical pick-up apparatus.

A one hundred twenty ninth structure of the light converging optical system of the invention is characterized in that at least one optical element constituting the light converging-optical system is formed of the material whose specific gravity is not larger than 2.0. The effect of such the invention is the same as in the eighteenth structure of the optical pick-up apparatus.

A one hundred thirtieth structure of the light converging optical system of the invention is characterized in that at least one optical element constituting the light converging optical system is formed of the plastic material. The effect of such the invention is the same as in the nineteenth structure of the optical pick-up apparatus.

A one hundred thirty first structure of the light converging optical system of the invention is characterized in that at least one optical element constituting the light converging optical system is formed of the material whose saturation water absorption is not larger than 0.5%. The effect of such the invention is the same as in the twentieth structure of the optical pick-up apparatus.

A one hundred thirty second structure of the light converging optical system of the invention is characterized in that at least one optical element constituting the light converging optical system is formed of the material whose internal transmissivity at the 3 mm thickness to the light of the oscillation wavelength of the light source is not smaller than 85%. The effect of such the invention is the same as in the twenty first structure of the optical pick-up apparatus.

A one hundred thirty third structure of the light converging optical system of the invention is characterized in that the light converging optical system has at least 2 diaphragms to regulate the image side numerical aperture in a plurality of information recording layers of the optical information recording medium. The effect of such the invention is the same as in the twenty second structure of the optical pick-up apparatus.

A one hundred thirty fourth structure of the light converging optical system of the invention is characterized in that at least one of diaphragms is positioned between the final optical element and the optical information recording medium. The effect of such the invention is the same as in the twenty third structure of the optical pick-up apparatus.

A one hundred thirty fifth structure of the light converging optical system of the invention is characterized in that at least one optical element of the light converging optical system is formed by etching. The effect of such the invention is the same as in the twenty fourth structure of the optical pick-up apparatus.

In a one hundred thirty sixth structure of the light converging optical system of the optical pick-up apparatus which has the light source and the light converging optical system to light converge the luminous flux emitted from the light source onto any one of information recording layers of the optical information recording medium having a laminated plurality of information recording layers, and by which the recording and/or reproducing of the information is conducted onto the optical information recording medium, the light converging optical system is characterized in that the optical information recording medium has a transparent substrate whose thickness is not smaller than the wavelength of the light source on the information recording layer nearest to the light converging optical system side, and the light converging optical system has the final optical element opposite to the optical information recording medium spacing the distance not larger than the wavelength of the light source, and when the light converging optical system light converges the luminous flux whose image side numerical aperture is not smaller than 1.0, onto the information recording layer through the transparent substrate, the recording or reproducing of the information is conducted onto the information recording layer. The effect of such the invention is the same as in the forty eighth structure of the optical pick-up apparatus.

A one hundred thirty seventh structure of the light converging optical system of the invention is characterized in that the final optical surface of final optical element is approximate to the surface of the optical information recording medium spacing the interval not larger than one fourth of the wavelength of the light source. The effect of such the invention is the same as in the third structure of the optical pick-up apparatus.

A one hundred thirty eighth structure of the light converging optical system of the invention is characterized in that a plurality of light converging optical systems are provided, and each of light converging optical systems is used for the recording or reproducing of the information onto the respectively different information recording layers. The effect of such the invention is the same as in the fourth structure of the optical pick-up apparatus.

A one hundred thirty ninth structure of the light converging optical system of the invention is characterized in that it has a selection means for selecting the information recording layer onto which the recording or reproducing is to be conducted, from the laminated plurality of information recording layers, and the recording or reproducing of the information is conducted onto the information recording layer selected by the selection means. The effect of such the invention is the same as in the fifth structure of the optical pick-up apparatus.

A one hundred fortieth structure of the light converging optical system of the invention is characterized in that a plurality of light converging optical systems are provided, and each of light converging optical systems is used for the recording or reproducing of the information onto the respectively different information recording layers, and when the selection means selects any one of the plurality of final optical elements, the recording or reproducing of the information is conducted onto the information recording layer corresponding to the selected final optical element. The effect of such the invention is the same as in the sixth structure of the optical pick-up apparatus.

A one hundred forty first structure of the light converging optical system of the invention is characterized in that the selection means changes the wavelength of the light source corresponding to each of laminated information recording layers onto which the recording or reproducing of the information is to be conducted. The effect of such the invention is the same as in the seventh structure of the optical pick-up apparatus.

A one hundred forty second structure of the light converging optical system of the invention is characterized in that the selection means provides at least one optical element to vary the divergence degree or convergence degree of the incident light into the final optical element on the light source side of the final optical element, corresponding to each of laminated information recording layers onto which the recording or reproducing of the information is to be conducted. The effect of such the invention is the same as in the eighth structure of the optical pick-up apparatus.

A one hundred forty third structure of the light converging optical system of the invention is characterized in that the optical element to vary the divergence degree or convergence degree of the incident light into the final optical element, has the positive lens group having the positive refractive power and the negative lens group having the negative refractive power, and at least one lens group of them is a displaceable movable element. The effect of such the invention is the same as in the ninth structure of the optical pick-up apparatus.

A one hundred forty fourth structure of the light converging optical system of the invention is characterized in that the optical element to vary the divergence degree or convergence degree of the incident light into the final optical element, is composed of one positive lens and one negative lens, and at least one of them is a displaceable movable element. The effect of such the invention is the same as in the tenth structure of the optical pick-up apparatus.

A one hundred forty fifth structure of the light converging optical system of the invention is characterized in that the information recording medium includes the first recording layer and the second recording layer in the order of the distance nearer from the final optical element, and when the recording or reproducing is conducted onto the first recording layer, the interval between the negative lens group and the positive lens group or the interval between the negative lens and the positive lens is more increased than the case where the recording or reproducing of the information is conducted onto the second recording layer. The effect of such the invention is the same as in the eleventh structure of the optical pick-up apparatus.

A one hundred forty sixth structure of the light converging optical system of the invention is characterized in that the optical element to vary the divergence degree or convergence degree of the incident light into the final optical element, corrects the spherical aberration or axial chromatic aberration which hinders the recording or reproducing of the information, in the information recording layer onto which the recording or reproducing is to be conducted. The effect of such the invention is the same as in the twelfth structure of the optical pick-up apparatus.

A one hundred forty seventh structure of the light converging optical system of the invention is characterized in that the optical element to correct the variation of the spherical aberration and the axial chromatic aberration satisfies the following expression.

$$vdP > vdN \quad (1)$$

Where, vdP: the average of Abbe's number of the d line of all positive lenses including the positive lens (group), vdN: the average of Abbe's number of the d line of all negative lenses including the negative lens (group). The effect of such the invention is the same as in the thirteenth structure of the optical pick-up apparatus.

A one hundred forty eighth structure of the light converging optical system of the invention is characterized in that the vdP and the vdN satisfy the following expressions.

$$vdP > 55 \quad (2)$$

$$vdN < 35 \quad (3)$$

The effect of such the invention is the same as in the fourteenth structure of the optical pick-up apparatus.

A one hundred forty ninth structure of the light converging optical system of the invention is characterized in that the optical element to vary the divergence degree or convergence degree of the incident light into the final optical element can change the refractive index distribution. The effect of such the invention is the same as in the fifteenth structure of the optical pick-up apparatus.

A one hundred fiftieth structure of the light converging optical system of the invention is characterized in that at least one optical element constituting the light converging optical system has at least one aspherical optical surface. The effect of such the invention is the same as in the sixteenth structure of the optical pick-up apparatus.

A one hundred fifty first structure of the light converging optical system of the invention is characterized in that at least one optical element constituting the light converging optical system has a diffraction surface having a ring band-like diffraction structure. The effect of such the invention is the same as in the seventeenth structure of the optical pick-up apparatus.

A one hundred fifty second structure of the light converging optical system of the invention is characterized in that at least one optical element constituting the light converging optical system is formed of the material whose specific gravity is not larger than 2.0. The effect of such the invention is the same as in the eighteenth structure of the optical pick-up apparatus.

A one hundred fifty third structure of the light converging optical system of the invention is characterized in that at least one optical element constituting the light converging optical system is formed of the plastic material. The effect of such the invention is the same as in the nineteenth structure of the optical pick-up apparatus.

A one hundred fifty fourth structure of the light converging optical system of the invention is characterized in that at least one optical element constituting the light converging optical system is formed of the material whose saturation water absorption is not larger than 0.5%. The effect of such the invention is the same as in the twentieth structure of the optical pick-up apparatus.

A one hundred fifty fifth structure of the light converging optical system of the invention is characterized in that at least one optical element constituting the light converging optical system is formed of the material whose internal transmissivity at the 3 mm thickness to the light of the oscillation wavelength of the light source is not smaller than 85%. The effect of such the invention is the same as in the twenty first structure of the optical pick-up apparatus.

A one hundred fifty sixth structure of the light converging optical system of the invention is characterized in that the light converging optical system has at least 2 diaphragms to regulate the image side numerical aperture in a plurality of information recording layers of the optical information recording medium. The effect of such the invention is the same as in the twenty second structure of the optical pick-up apparatus.

A one hundred fifty seventh structure of the light converging optical system of the invention is characterized in that at least one of diaphragms is positioned between the final optical element and the optical information recording medium. The effect of such the invention is the same as in the twenty third structure of the optical pick-up apparatus.

A one hundred fifty eighth structure of the light converging optical system of the invention is characterized in that at least one optical element of the light converging optical system is formed by etching. The effect of such the invention is the same as in the twenty fourth structure of the optical pick-up apparatus.

In a one hundred fifty ninth structure of the light converging optical system of the optical pick-up apparatus of the invention which has the light source and the light converging optical system to light converge the luminous flux emitted from the light source onto any one of information recording layers of the optical information recording medium having a laminated plurality of information recording layers, and by which the recording and/or reproducing of the information is conducted onto the optical information recording medium, the light converging optical system is characterized in that, it is provided with the optical element to change the information recording layer onto which the recording or reproducing of the information is to be conducted, between the light source and the final optical element of the light converging optical system. The effect of such the invention is the same as in the seventy first structure of the optical pick-up apparatus.

A one hundred sixtieth structure of the light converging optical system of the invention is characterized in that the optical element to change the information recording layers onto which the information is to be recorded or reproduced varies the divergence degree or convergence degree of the incident light into the final optical element. The effect of such the invention is the same as in the eighth structure of the optical pick-up apparatus.

A one hundred sixty first structure of the light converging optical system of the invention is characterized in that the optical element by which the divergence degree or convergence degree of the incident light into the final optical element is changed, has the positive lens group having the positive refractive power and the negative lens group having the negative refractive power, and at least one lens group of them is a displaceable movable element. The effect of such the invention is the same as in the ninth structure of the optical pick-up apparatus.

A one hundred sixty second structure of the light converging optical system of the invention is characterized in that the optical element to vary the divergent degree or convergence degree of the incident light into the final optical element is composed of one positive lens and one negative lens, and at least one of them is a displaceable movable element. The effect of such the invention is the same as in the tenth structure of the optical pick-up apparatus.

A one hundred sixty third structure of the light converging optical system of the invention is characterized in that the information recording medium includes the first recording layer and the second recording layer in the order of the distance nearer from the final optical element, and when the recording or reproducing is conducted onto the first recording layer, the interval between the negative lens group and the positive lens group or the interval between the negative lens and the positive lens is more increased than the case where the recording or reproducing of the information is conducted onto the second recording layer. The effect of such the invention is the same as in the eleventh structure of the optical pick-up apparatus.

A one hundred sixty fourth structure of the light converging optical system of the invention is characterized in that the optical element to vary the divergence degree or convergence degree of the incident light into the final optical element corrects the spherical aberration or axial chromatic aberration which hinders the recording or reproducing of the information in the information recording layer onto which the recording or reproducing is to be conducted. The effect of such the invention is the same as in the twelfth structure of the optical pick-up apparatus.

A one hundred sixty fifth structure of the light converging optical system of the invention_is characterized in that the optical element which corrects the spherical aberration and axial chromatic aberration satisfies the following expression.

$$vdP > vdN \tag{1}$$

Where, vdP: the average of Abbe's number of the d line of all positive lenses including the positive lens (group), vdN: the average of Abbe's number of the d line of all negative lenses including the negative lens (group). The effect of such the invention is the same as in the thirteenth structure of the optical pick-up apparatus.

A one hundred sixty sixth structure of the light converging optical system of the invention is characterized in that the vdP and the vdN satisfy the following expressions.

$$vdP > 55 \tag{2}$$

$$vdN < 35 \tag{3}$$

The effect of such the invention is the same as in the fourteen structure of the optical pick-up apparatus.

A one hundred sixty seventh structure of the light converging optical system of the invention is characterized in that the optical element to vary the divergence degree and the convergence degree of the incident light into the final optical element can change the refractive index distribution. The effect of such the invention is the same as in the fifteenth structure of the optical pick-up apparatus.

A one hundred sixty eighth structure of the light converging optical system of the invention is characterized in that at least one optical element constituting the light converging optical system has at least one aspherical optical surface. The effect of such the invention is the same as in the sixteenth structure of the optical pick-up apparatus.

A one hundred sixty ninth structure of the light converging optical system of the invention is characterized in that at least one optical element constituting the light converging optical system has the diffraction surface having the ring band-like diffraction structure. The effect of such the invention is the same as in the seventeenth structure of the optical pick-up apparatus.

A one hundred seventieth structure of the light converging optical system of the invention is characterized in that at least one optical element constituting the light converging optical system is formed of the material whose specific gravity is not larger than 2.0. The effect of such the invention is the same as in the eighteenth structure of the optical pick-up apparatus.

A one hundred seventy first structure of the light converging optical system of the invention is characterized in that at least one optical element constituting the light converging optical system is formed of the plastic material. The effect of such the invention is the same as in the nineteenth structure of the optical pick-up apparatus.

A one hundred seventy second structure of the light converging optical system of the invention is characterized in that at least one optical element constituting the light converging optical system is formed of the material whose saturation water absorption is not larger than 0.5%. The effect of such the invention is the same as in the twentieth structure of the optical pick-up apparatus.

A one hundred seventy third structure of the light converging optical system of the invention is characterized in that at least one optical element constituting the light converging optical system is formed of the material whose internal transmissivity at the 3 mm thickness to the light of oscillation wavelength of the light source is not smaller than 85%. The effect of such the invention is the same as in the twenty first structure of the optical pick-up apparatus.

A one hundred seventy fourth structure of the light converging optical system of the invention is characterized in that the light converging optical system has at least 2 diaphragms to regulate the image side numerical aperture in a plurality of information recording layers of the optical information recording medium. The effect of such the invention is the same as in the twenty second structure of the optical pick-up apparatus.

A one hundred seventy fifth structure of the light converging optical system of the invention is characterized in that at least one diaphragm of the diaphragms is positioned between the final optical element and the optical information recording medium. The effect of such the invention is the same as in the twenty third structure of the optical pick-up apparatus.

A one hundred seventy sixth structure of the light converging optical system of the invention is characterized in that at least one optical element of the light converging optical system is formed by etching. The effect of such the invention is the same as in the twenty fourth structure of the optical pick-up apparatus.

A one hundred seventy seventh structure of the optical information recording and reproducing method of the invention is characterized in that, by using an optical pick-up apparatus which has the light source and the light converging optical system to light converge the luminous flux emitted from the light source onto any one of information recording layers of the optical information recording medium having a laminated plurality of information recording layers, the recording or reproducing of the information is conducted onto the information recording layer by the luminous flux whose image side numerical aperture is not smaller than 1.0, from the light converging optical system. The effect of such the invention is the same as in the first structure of the optical pick-up apparatus.

A one hundred seventy eighth structure of the optical information recording and reproducing method of the invention is characterized in that the light converging optical system has the final optical element opposite to the optical information recording medium, and the final optical surface of the final optical element is in contact with the surface of the optical information recording medium. The effect of such the invention is the same as in the second structure of the optical pick-up apparatus.

A one hundred seventy ninth structure of the optical information recording and reproducing method of the invention is characterized in that the light converging optical system has the final optical element opposite to the optical information recording medium, and the final optical surface of the final optical element is approximate to the surface of the optical information recording medium spacing the interval not larger than one fourth of the wavelength of the light source. The effect of such the invention is the same as in the third structure of the optical pick-up apparatus.

A one hundred eightieth structure of the optical information recording and reproducing method of the invention is characterized in that a plurality of light converging optical systems are provided, and each of light converging optical systems is used for the recording or reproducing of the information onto the respectively different information recording layers. The effect of such the invention is the same as in the fourth structure of the optical pick-up apparatus.

A one hundred eighty first structure of the optical information recording and reproducing method of the invention is characterized in that the optical pick-up apparatus has a selection means for selecting the information recording layer onto which the recording or reproducing is to be conducted, from a laminated plurality of information recording layers, and the recording or reproducing of the information is conducted onto the information recording layer selected by the selection means. The effect of such the invention is the same as in the fifth structure of the optical pick-up apparatus.

A one hundred eighty second structure of the optical information recording and reproducing method of the invention is characterized in that the light converging optical system has at least 2 final optical elements, and each of the final optical elements is used for the recording or reproducing of the information onto the respectively different information recording layers, and when the selection means selects either one of the plurality of final optical elements, the recording or reproducing of the information is conducted onto the information recording layer corresponding to the selected final optical element. The effect of such the invention is the same as in the sixth structure of the optical pick-up apparatus.

A one hundred eighty third structure of the optical information recording and reproducing method of the invention is characterized in that the selection means changes the wavelength of the light source, corresponding to each of laminated information recording layers onto which the recording or reproducing of the information is to be conducted. The effect of such the invention is the same as in the seventh structure of the optical pick-up apparatus.

A one hundred eighty fourth structure of the optical information recording and reproducing method of the invention is characterized in that the selection means provides at least one optical element to vary the divergence degree or convergence degree of the incident light into the final optical element on the light source side of the final optical element, corresponding to each of laminated information recording layers onto which the recording or reproducing of the information is to be conducted. The effect of such the invention is the same as in the eighth structure of the optical pick-up apparatus.

A one hundred eighty fifth structure of the optical information recording and reproducing method of the invention is characterized in that the optical element to vary the divergence degree or convergence degree of the incident light into the final optical element, has the positive lens group having the positive refractive power and the negative lens group having the negative refractive power, and at least one lens group of them is a displaceable movable element. The effect of such the invention is the same as in the ninth structure of the optical pick-up apparatus.

A one hundred eighty sixth structure of the optical information recording and reproducing method of the invention is characterized in that the optical element to vary the divergence degree or convergence degree of the incident light into the final optical element, is composed of one positive lens and one negative lens, and at least one of them is a displaceable movable element. The effect of such the invention is the same as in the tenth structure of the optical pick-up apparatus.

A one hundred eighty seventh structure of the optical information recording and reproducing method of the invention is characterized in that the information recording medium includes the first recording layer and the second recording layer in the order of the distance nearer from the final optical element, and when the recording or reproducing is conducted onto the first recording layer, the interval between the negative lens group and the positive lens group or the interval between the negative lens and the positive lens is more increased than the case where the recording or reproducing of the information is conducted onto the second recording layer. The effect of such the invention is the same as in the eleventh structure of the optical pick-up apparatus.

A one hundred eighty eighth structure of the optical information recording and reproducing method of the invention is characterized in that the optical element to vary the divergence degree or convergence degree of the incident light into the final optical element, corrects the spherical aberration or axial chromatic aberration which hinders the recording or reproducing of the information, in the information recording layer onto which the recording or reproducing is to be conducted. The effect of such the invention is the same as in the twelfth structure of the optical pick-up apparatus.

A one hundred eighty ninth structure of the optical information recording and reproducing method of the invention is characterized in that the optical element to correct the variation of the spherical aberration and the axial chromatic aberration satisfies the following expression.

$$vdP > vdN \quad (1)$$

Where, vdP: the average of Abbe's number of the d line of all positive lenses including the positive lens (group), vdN: the average of Abbe's number of the d line of all negative lenses including the negative lens (group). The effect of such the invention is the same as in the thirteenth structure of the optical pick-up apparatus.

A one hundred ninetieth structure of the optical information recording and reproducing method of the invention is characterized in that the vdP and the vdN satisfy the following expressions.

$$vdP > 55 \quad (2)$$

$$vdN < 35 \quad (3)$$

The effect of such the invention is the same as in the fourteenth structure of the optical pick-up apparatus.

A one hundred ninety first structure of the optical information recording and reproducing method of the invention is characterized in that the optical element to vary the divergence degree or convergence degree of the incident light into the final optical element can change the refractive index distribution. The effect of such the invention is the same as in the fifteenth structure of the optical pick-up apparatus.

A one hundred ninety second structure of the optical information recording and reproducing method of the invention is characterized in that at least one optical element constituting the light converging optical system has at least one aspherical optical surface. The effect of such the invention is the same as in the sixteenth structure of the optical pick-up apparatus.

A one hundred ninety third structure of the optical information recording and reproducing method of the invention is characterized in that at least one optical element constituting the light converging optical system has a diffraction surface having a ring band-like diffraction structure. The effect of such the invention is the same as in the seventeenth structure of the optical pick-up apparatus.

A one hundred ninety fourth structure of the optical information recording and reproducing method of the invention is characterized in that at least one optical element constituting the light converging optical system is formed of the material whose specific gravity is not larger than 2.0. The effect of such the invention is the same as in the eighteenth structure of the optical pick-up apparatus.

A one hundred ninety fifth structure of the optical information recording and reproducing method of the invention is characterized in that at least one optical element constituting the light converging optical system is formed of the plastic material. The effect of such the invention is the same as in the nineteenth structure of the optical pick-up apparatus.

A one hundred ninety sixth structure of the optical information recording and reproducing method of the invention is characterized in that at least one optical element constituting the light converging optical system is formed of the material whose saturation water absorption is not larger than 0.5%. The effect of such the invention is the same as in the twentieth structure of the optical pick-up apparatus.

A one hundred ninety seventh structure of the optical information recording and reproducing method of the invention is characterized in that at least one optical element constituting the light converging optical system is formed of the material whose internal transmissivity at the 3 mm thickness to the light of the oscillation wavelength of the light source is not smaller than 85%. The effect of such the invention is the same as in the twenty first structure of the optical pick-up apparatus.

A one hundred ninety eighth structure of the optical information recording and reproducing method of the invention is characterized in that the light converging optical system has at least 2 diaphragms to regulate the image side numerical aperture in a plurality of information recording layers of the optical information recording medium. The effect of such the invention is the same as in the twenty second structure of the optical pick-up apparatus.

A one hundred ninety ninth structure of the optical information recording and reproducing method of the invention is characterized in that at least one of diaphragms is positioned between the final optical element and the optical information recording medium. The effect of such the invention is the same as in the twenty third structure of the optical pick-up apparatus.

A two hundredth structure of the optical information recording and reproducing method of the invention is characterized in that at least one optical element of the light converging optical system is formed by etching. The effect of such the invention is the same as in the twenty fourth structure of the optical pick-up apparatus.

In a two hundred first structure of the optical information recording and reproducing method of invention, the optical pick-up apparatus has the light source and the light converging optical system to light converge the luminous flux emitted from the light source onto any one of information recording layers of the optical information recording medium having a laminated plurality of information recording layers, and the optical information recording and reproducing method is characterized in that, when the light converging optical system light converges the luminous flux whose image side numerical aperture is not smaller than 1.0, onto the information recording layer, by using the optical pick-up apparatus having the final optical element opposite to the optical information recording medium, spacing the interval not larger than the wavelength of the light source, the recording or reproducing of the information is to conducted onto the information recording layer. The effect of such the invention is the same as in the twenty fifth structure of the optical pick-up apparatus.

A two hundred second structure of the optical information recording and reproducing method of the invention is characterized in that the light converging optical system has the final optical element opposite to the optical information recording medium and the final optical surface of the final optical element is approximate to the surface of the optical information recording medium spacing the interval not larger than one fourth of the wavelength of the light source. The effect of such the invention is the same as in the third structure of the optical pick-up apparatus.

A two hundred third structure of the optical information recording and reproducing method of the invention is characterized in that a plurality of light converging optical systems are provided, and each of light converging optical systems is used for the recording or reproducing of the information onto the respectively different information recording layers. The effect of such the invention is the same as in the fourth structure of the optical pick-up apparatus.

A two hundred fourth structure of the optical information recording and reproducing method of the invention is characterized in that the optical pick-up apparatus has a selection means for selecting the information recording layer onto which the recording or reproducing is to be conducted, from a laminated plurality of information recording layers, and the recording or reproducing of the information is conducted onto the information recording layer selected by the selection means. The effect of such the invention is the same as in the fifth structure of the optical pick-up apparatus.

A two hundred fifth structure of the optical information recording and reproducing method of the invention is characterized in that the light converging optical system has at least 2 final optical elements, and each of the final optical elements is used for the recording or reproducing of the information onto the respectively different information recording layers, and when the selection means selects any one of the plurality of final optical elements, the recording or reproducing of the information is conducted onto the information recording layer corresponding to the selected final optical element. The effect of such the invention is the same as in the sixth structure of the optical pick-up apparatus.

A two hundred sixth structure of the optical information recording and reproducing method of the invention is characterized in that the selection means changes the wavelength of the light source, corresponding to each of laminated information recording layers onto which the recording or reproducing of the information is to be conducted. The effect of such the invention is the same as in the seventh structure of the optical pick-up apparatus.

A two hundred seventh structure of the optical information recording and reproducing method of the invention is characterized in that the selection means provides at least one optical element to vary the divergence degree or convergence degree of the incident light into the final optical element on the light source side of the final optical element, corresponding to each of laminated information recording layers onto which the recording or reproducing of the information is to be conducted. The effect of such the invention is the same as in the eighth structure of the optical pick-up apparatus.

A two hundred eighth structure of the optical information recording and reproducing method of the invention is characterized in that the optical element to vary the divergence degree or convergence degree of the incident light into the final optical element, has the positive lens group having the positive refractive power and the negative lens group having the negative refractive power, and at least one lens group of them is displaceable movable element. The effect of such the invention is the same as in the ninth structure of the optical pick-up apparatus.

A two hundred ninth structure of the optical information recording and reproducing method of the invention is characterized in that the optical element to vary the divergence degree or convergence degree of the incident light into the final optical element, is composed of one positive lens and one negative lens, and at least one of them is a displaceable movable element. The effect of such the invention is the same as in the tenth structure of the optical pick-up apparatus.

A two hundred tenth structure of the optical information recording and reproducing method of the invention is characterized in that the information recording medium includes the first recording layer and the second recording layer in the order of the distance nearer from the final optical element, and when the recording or reproducing is conducted onto the first recording layer, the interval between the negative lens group and the positive lens group or the interval between the negative lens and the positive lens is more increased than the case where the recording or reproducing of the information is conducted onto the second recording layer. The effect of such the invention is the same as in the eleventh structure of the optical pick-up apparatus.

A two hundred eleventh structure of the optical information recording and reproducing method of the invention is characterized in that the optical element to vary the divergence degree or convergence degree of the incident light into the final optical element, corrects the spherical aberration or axial chromatic aberration which hinders the recording or reproducing of the information, in the information recording layer onto which the recording or reproducing is to be conducted. The effect of such the invention is the same as in the twelfth structure of the optical pick-up apparatus.

A two hundred twelfth structure of the optical information recording and reproducing method of the invention is characterized in that the optical element to correct the variation of the spherical aberration and the axial chromatic aberration satisfies the following expression.

$$vdP > vdN \qquad (1)$$

Where, vdP: the average of Abbe's number of the d line of all positive lenses including the positive lens (group), vdN: the average of Abbe's number of the d line of all negative lenses including the negative lens (group). The effect of such the invention is the same as in the thirteenth structure of the optical pick-up apparatus.

A two hundred thirteenth structure of the optical information recording and reproducing method of the invention is characterized in that the vdP and the vdN satisfy the following expressions.

$$vdP > 55 \qquad (2)$$

$$vdN < 35 \qquad (3)$$

The effect of such the invention is the same as in the fourteenth structure of the optical pick-up apparatus.

A two hundred fourteenth structure of the optical information recording and reproducing method of the invention is characterized in that the optical element to vary the divergence degree or convergence degree of the incident light into the final optical element can change the refractive index distribution. The effect of such the invention is the same as in the fifteenth structure of the optical pick-up apparatus.

A two hundred fifteenth structure of the optical information recording and reproducing method of the invention is characterized in that at least one optical element constituting the light converging optical system has at least one aspherical optical surface. The effect of such the invention is the same as in the sixteenth structure of the optical pick-up apparatus.

A two hundred sixteenth structure of the optical information recording and reproducing method of the invention is characterized in that at least one optical element constituting the light converging optical system has a diffraction surface having a ring band-like diffraction structure. The effect of such the invention is the same as in the seventeenth structure of the optical pick-up apparatus.

A two hundred seventeenth structure of the optical information recording and reproducing method of the invention is characterized in that at least one optical element constituting the light converging optical system is formed of the material whose specific gravity is not larger than 2.0. The effect of such the invention is the same as in the eighteenth structure of the optical pick-up apparatus.

A two hundred eighteenth structure of the optical information recording and reproducing method of the invention is characterized in that at least one optical element constituting the light converging optical system is formed of the plastic material. The effect of such the invention is the same as in the nineteenth structure of the optical pick-up apparatus.

A two hundred nineteenth structure of the optical information recording and reproducing method of the invention is characterized in that at least one optical element constituting the light converging optical system is formed of the material whose saturation water absorption is not larger than 0.5%. The effect of such the invention is the same as in the twentieth structure of the optical pick-up apparatus.

A two hundred twentieth structure of the optical information recording and reproducing method of the invention is characterized in that at least one optical element constituting the light converging optical system is formed of the material whose internal transmissivity at the 3 mm thickness to the light of the oscillation wavelength of the light source is not smaller than 85%. The effect of such the invention is the same as in the twenty first structure of the optical pick-up apparatus.

A two hundred twenty first structure of the optical information recording and reproducing method of the invention is characterized in that the light converging optical system has at least 2 diaphragms to regulate the image side numerical aperture in a plurality of information recording layers of the optical information recording medium. The effect of such the invention is the same as in the twenty second structure of the optical pick-up apparatus.

A two hundred twenty second structure of the optical information recording and reproducing method of the invention is characterized in that at least one diaphragm of the diaphragms is positioned between the final optical element and the optical information recording medium. The effect of such the invention is the same as in the twenty third structure of the optical pick-up apparatus.

A two hundred twenty third structure of the optical information recording and reproducing method of the invention is characterized in that at least one optical element of the light converging optical system is formed by etching. The effect of such the invention is the same as in the twenty fourth structure of the optical pick-up apparatus.

A two hundred twenty fourth structure of the optical information recording and reproducing method of the invention is characterized in that the optical pick-up apparatus which has the light source and the light converging optical system to light converge the luminous flux emitted from the light source onto any one of information recording layers of the optical information recording medium having a transparent substrate whose thickness is not smaller than the wavelength of the light source on the outermost information recording layer, and when, by using the optical pick-up apparatus having the final optical element opposite to the transparent substrate spacing the interval not larger than the wavelength of the light source, the light converging optical system light-converges the luminous flux whose image side numerical aperture is not smaller than 1.0 onto the information recording layer, the recording or reproducing of the information is conducted onto the information recording layer. The effect of such the invention is the same as in the forty eighth structure of the optical pick-up apparatus.

A two hundred twenty fifth structure of the optical information recording and reproducing method of the invention is characterized in that the final optical surface of the final optical element is approximate to the surface of the optical information recording medium spacing the interval not larger than one fourth of the wavelength of the light source. The effect of such the invention is the same as in the third structure of the optical pick-up apparatus.

A two hundred twenty sixth structure of the optical information recording and reproducing method of the invention is characterized in that a plurality of light converging optical systems are provided, and each of light converging optical systems is used for the recording or reproducing of the information onto the respectively different information recording layers. The effect of such the invention is the same as in the fourth structure of the optical pick-up apparatus.

A two hundred twenty seventh structure of the optical information recording and reproducing method of the invention is characterized in that the optical pick-up apparatus has a selection means for selecting the information recording layer onto which the recording or reproducing is to be conducted, from a laminated plurality of information recording layers, and the recording or reproducing of the information is conducted onto the information recording layer selected by the selection means. The effect of such the invention is the same as in the fifth structure of the optical pick-up apparatus.

A two hundred twenty eighth structure of the optical information recording and reproducing method of the invention is characterized in that the light converging optical system has at least 2 final optical elements, and each of the final optical elements is used for the recording or reproducing of the information onto the respectively different information recording layers, and when the selection means selects any one of the plurality of final optical elements, the recording or reproducing of the information is conducted onto the information recording layer corresponding to the selected final optical element. The effect of such the invention is the same as in the sixth structure of the optical pick-up apparatus.

A two hundred twenty ninth structure of the optical information recording and reproducing method of the invention is characterized in that the selection means changes the wavelength of the light source, corresponding to each of laminated information recording layers onto which the recording or reproducing of the information is to be conducted. The effect of such the invention is the same as in the seventh structure of the optical pick-up apparatus.

A two hundred thirtieth structure of the optical information recording and reproducing method of the invention is characterized in that the selection means provides at least one optical element to vary the divergence degree or convergence degree of the incident light into the final optical element on the light source side of the final optical element, corresponding to each of laminated information recording layers onto which the recording or reproducing of the information is to be conducted. The effect of such the invention is the same as in the eighth structure of the optical pick-up apparatus.

A two hundred thirty first structure of the optical information recording and reproducing method of the invention is characterized in that the optical element to vary the divergence degree or convergence degree of the incident light into the final optical element, has the positive lens group having the positive refractive power and the negative lens group having the negative refractive power, and at least one lens group of them is a displaceable movable element. The effect of such the invention is the same as in the ninth structure of the optical pick-up apparatus.

A two hundred thirty second structure of the optical information recording and reproducing method of the invention is characterized in that the optical element to vary the divergence degree or convergence degree of the incident light into the final optical element, is composed of one positive lens and one negative lens, and at least one of them is a displaceable movable element. The effect of such the invention is the same as in the tenth structure of the optical pick-up apparatus.

A two hundred thirty third structure of the optical information recording and reproducing method of the invention is characterized in that the information recording medium includes the first recording layer and the second recording layer in the order of the distance nearer from the final optical element, and when the recording or reproducing is conducted onto the first recording layer, the interval between the negative lens group and the positive lens group or the interval between the negative lens and the positive lens is more increased than the case where the recording or reproducing of the information is conducted onto the second recording layer. The effect of such the invention is the same as in the eleventh structure of the optical pick-up apparatus.

A two hundred thirty fourth structure of the optical information recording and reproducing method of the invention is characterized in that the optical element to vary the divergence degree or convergence degree of the incident light into the final optical element, corrects the spherical aberration or axial chromatic aberration which hinders the recording or reproducing of the information, in the information recording layer onto which the recording or reproducing is to be conducted. The effect of such the invention is the same as in the twelfth structure of the optical pick-up apparatus.

A two hundred thirty fifth structure of the optical information recording and reproducing method of the invention is characterized in that the optical element to correct the variation of the spherical aberration and the axial chromatic aberration satisfies the following expression.

$$vdP > vdN \quad (1)$$

Where, vdP: the average of Abbe's number of the d line of all positive lenses including the positive lens (group), vdN: the average of Abbe's number of the d line of all negative lenses including the negative lens (group). The effect of such the invention is the same as in the thirteenth structure of the optical pick-up apparatus.

A two hundred thirty sixth structure of the optical information recording and reproducing method of the invention is characterized in that the vdP and the vdN satisfy the following expressions.

$$vdP > 55 \quad (2)$$

$$vdN < 35 \quad (3)$$

The effect of such the invention is the same as in the fourteenth structure of the optical pick-up apparatus.

A two hundred thirty seventh structure of the optical information recording and reproducing method of the invention is characterized in that the optical element to vary the divergence degree or convergence degree of the incident light into the final optical element can change the refractive index distribution. The effect of such the invention is the same as in the fifteenth structure of the optical pick-up apparatus.

A two hundred thirty eighth structure of the optical information recording and reproducing method of the invention is characterized in that at least one optical element constituting the light converging optical system has at least one aspherical optical surface. The effect of such the invention is the same as in the sixteenth structure of the optical pick-up apparatus.

A two hundred thirty ninth structure of the optical information recording and reproducing method of the invention is characterized in that at least one optical element constituting the light converging optical system has a diffraction surface having a ring band-like diffraction structure. The effect of such the invention is the same as in the seventeenth structure of the optical pick-up apparatus.

A two hundred fortieth structure of the optical information recording and reproducing method of the invention is characterized in that at least one optical element constituting the light converging optical system is formed of the material whose specific gravity is not larger than 2.0. The effect of such the invention is the same as in the eighteenth structure of the optical pick-up apparatus.

A two hundred forty first structure of the optical information recording and reproducing method of the invention is characterized in that at least one optical element constituting the light converging optical system is formed of the plastic material. The effect of such the invention is the same as in the nineteenth structure of the optical pick-up apparatus.

A two hundred forty second structure of the optical information recording and reproducing method of the invention is characterized in that at least one optical element constituting the light converging optical system is formed of the material whose saturation water absorption is not larger than 0.5%. The effect of such the invention is the same as in the twentieth structure of the optical pick-up apparatus.

A two hundred forty third structure of the optical information recording and reproducing method of the invention is characterized in that at least one optical element constituting the light converging optical system is formed of the material whose internal transmissivity at the 3 mm thickness to the light of the oscillation wavelength of the light source is not smaller than 85%. The effect of such the invention is the same as in the twenty first structure of the optical pick-up apparatus.

A two hundred forty fourth structure of the optical information recording and reproducing method of the invention is characterized in that the light converging optical system has at least 2 diaphragms to regulate the image side numerical aperture in a plurality of information recording layers of the optical information recording medium. The effect of such the invention is the same as in the twenty second structure of the optical pick-up apparatus.

A two hundred forty fifth structure of the optical information recording and reproducing method of the invention is characterized in that at least one diaphragm of the diaphragm is positioned between the final opical element and the optical information recording medium. The effect of such the invention is the same as in the twenty third structure of the optical pick-up apparatus.

A two hundred forty sixth structure of the optical information recording and reproducing method of the invention is characterized in that at least one optical element of the light converging optical system is formed by etching. The effect of such the invention is the same as in the twenty fourth structure of the optical pick-up apparatus.

In a two hundred forty seventh structure of the optical information recording and reproducing method of the invention, in which, by using the optical pick-up apparatus which has the light source and the light converging optical system to light converge the luminous flux emitted from the light source onto any one of information recording layers of the optical information recording medium having a plurality of laminated information recording layers, the recording or reproducing of the information is conducted onto the optical information recording medium, the optical information recording and reproducing method is characterized in that, by a predetermined optical pick-up element provided between the light source and the final optical element of the light converging optical system, the information recording layer onto which the recording or reproducing of the information is to be conducted is changed. The effect of such the invention is the same as in the seventy first of the optical pick-up apparatus.

A two hundred forty eighth structure of the optical information recording and reproducing method of the invention is characterized in that the optical element to change the information recording layer onto which the recording or reproducing of the information is to be conducted, varies the divergence degree or convergence degree of the incident light into the final optical element. The effect of such the invention is the same as in the eighth structure of the optical pick-up apparatus.

A two hundred forty ninth structure of the optical information recording and reproducing method of the invention is characterized in that the optical element to vary the divergence degree or convergence degree of the incident light into the final optical element, has the positive lens group having the positive refractive power and the negative lens group having the negative refractive power, and at least one lens group of them is a displaceable movable element. The effect of such the invention is the same as in the ninth structure of the optical pick-up apparatus.

A two hundred fiftieth structure of the optical information recording and reproducing method of the invention is characterized in that the optical element to vary the divergence degree or convergence degree of the incident light into the final optical element, is composed of one positive lens and one negative lens, and at least one of them is a displaceable movable element. The effect of such the invention is the same as in the tenth structure of the optical pick-up apparatus.

A two hundred fifty first structure of the optical information recording and reproducing method of the invention is characterized in that the information recording medium includes the first recording layer and the second recording layer in the order of the distance nearer from the final optical element, and when the recording or reproducing is conducted onto the first recording layer, the interval between the negative lens group and the positive lens group or the interval between the negative lens and the positive lens is more increased than the case where the recording or reproducing of the information is conducted onto the second recording layer. The effect of such the invention is the same as in the eleventh structure of the optical pick-up apparatus.

A two hundred fifty second structure of the optical information recording and reproducing method of the invention is characterized in that the optical element to vary the divergence degree or convergence degree of the incident light into the final optical element, corrects the spherical aberration or axial chromatic aberration which hinders the recording or reproducing of the information, in the information recording layer onto which the recording or reproducing is to be conducted. The effect of such the invention is the same as in the twelfth structure of the optical pick-up apparatus.

A two hundred fifty third structure of the optical information recording and reproducing method of the invention is characterized in that the optical element to correct the variation of the spherical aberration and the axial chromatic aberration satisfies the following expression.

$$vdP > vdN \quad (1)$$

Where, vdP: the average of Abbe's number of the d line of all positive lenses including the positive lens (group), vdN: the average of Abbe's number of the d line of all negative lenses including the negative lens (group). The effect of such the invention is the same as in the thirteenth structure of the optical pick-up apparatus.

A two hundred fifty fourth structure of the optical information recording and reproducing method of the invention is characterized in that the value vdP and the value vdN satisfy the following expressions.

$$vdP > 55 \quad (2)$$

$$vdN < 35 \quad (3)$$

The effect of such the invention is the same as in the fourteenth structure of the optical pick-up apparatus.

A two hundred fifty fifth structure of the optical information recording and reproducing method of the invention is characterized in that the optical element to vary the divergence degree or convergence degree of the incident light into the final optical element can change the refractive index distribution. The effect of such the invention is the same as in the fifteenth structure of the optical pick-up apparatus.

A two hundred fifty sixth structure of the optical information recording and reproducing method of the invention is characterized in that at least one optical element constituting the light converging optical system has at least one aspherical optical surface. The effect of such the invention is the same as in the sixteenth structure of the optical pick-up apparatus.

A two hundred fifty seventh structure of the optical information recording and reproducing method of the invention is characterized in that at least one optical element constituting the light converging optical system has a diffraction surface having a ring band-like diffraction structure. The effect of such the invention is the same as in the seventeenth structure of the optical pick-up apparatus.

A two hundred fifty eighth structure of the optical information recording and reproducing method of the invention is characterized in that at least one optical element constituting the light converging optical system is formed of the material whose specific gravity is not larger than 2.0. The effect of such the invention is the same as in the eighteenth structure of the optical pick-up apparatus.

A two hundred fifty ninth structure of the optical information recording and reproducing method of the invention is characterized in that at least one optical element constituting the light converging optical system is formed of the plastic material. The effect of such the invention is the same as in the nineteenth structure of the optical pick-up apparatus.

A two hundred sixtieth structure of the optical information recording and reproducing method of the invention is characterized in that at least one optical element constituting the light converging optical system is formed of the material whose saturation water absorption is not larger than 0.5%. The effect of such the invention is the same as in the twentieth structure of the optical pick-up apparatus.

A two hundred sixty first structure of the optical information recording and reproducing method of the invention is characterized in that at least one optical element constituting the light converging optical system is formed of the material whose internal transmissivity at the 3 mm thickness to the light of the oscillation wavelength of the light source is not smaller than 85%. The effect of such the invention is the same as in the twenty first structure of the optical pick-up apparatus.

A two hundred sixty second structure of the optical information recording and reproducing method of the invention is characterized in that the light converging optical system has at least 2 diaphragms to regulate the image side numerical aperture in a plurality of information recording layers of the optical information recording medium. The effect of such the invention is the same as in the twenty second structure of the optical pick-up apparatus.

A two hundred sixty third structure of the optical information recording and reproducing method of the invention is characterized in that at least one diaphragm of the diaphragms is positioned between the final optical element and the optical information recording medium. The effect of such the invention is the same as in the twenty third structure of the optical pick-up apparatus.

A two hundred sixty fourth structure of the optical information recording and reproducing method of the invention is characterized in that at least one optical element of the light converging optical system is formed by etching. The effect of such the invention is the same as in the twenty fourth structure of the optical pick-up apparatus.

In the present specification, the phrase of the recording or reproducing of the information onto the information recording layer, means, when the information recording layer is structured by the layer through which the light can be transmitted, and information recording surface, the information recording light is irradiated onto the information recording surface through the layer through which the light can be transmitted, and the recording of the information is conducted onto that position, or the reproducing of the information is conducted from that position.

The diffraction surface used in the present specification means that the surface of the optical element, for example, on the surface of the lens, a relief is provided, and a mode (or a surface) in (or on) which the angle of the light is changed by the diffraction, and when there is, on one optical surface, an area in which the diffraction is generated and not generated, it means the area in which the diffraction is generated. As the shape of the relief, for example, on the surface of the optical element, it is formed as an almost concentric circle-like ring band around the optical axis, and when viewing its cross section on the surface including the optical axis, it is well known that each ring band has a saw-toothed shape, and it includes such the shape. Specifically, such the saw-toothed ring band structure is preferable.

The light converging optical system used in the present specification means the optical element group to light converge the luminous flux emitted from the light source, or optical element group concerning the light convergence (for example, including a beam expander or negative lens of the aberration correction system). The final optical element means the optical element including in the light converging optical system which is most approximate to or in contact with the optical information recording medium.

The beam expander used in the present specification means at least one optical element such as a lens is displaceable, and thereby, the divergent angle (divergent action, convergent action are included) can be changed, and when almost parallel luminous flux is incident to it, it means a collective body of optical elements such as lenses (optical element group such as lens group) from which almost parallel light can be emitted. It is preferable that a plurality of optical elements such as these lenses are integrated, and when at least the optical element such as one lens is structured to be displaceable, the drive means such as a displacing apparatus to practically displace it, may not be included as a beam expander.

In the present specification, as the optical information recording medium, it may be a disk-like medium which rotates around the center of the disk as the axis, or may not be so. Further, as the recording or reproducing system of the information onto the information recording layer, it may be a stem using the phase change recording system such as a CD or DVD, or when it is a system in which the recording or reproducing is conducted by using the converged light, it may not be limited to that.

In the present specification, the recording or reproducing of the information means that the information is recorded on the information recording surface of the optical information recording medium as described above, or the information recorded on the information recording surface is reproduced. The optical pick-up apparatus of the present invention may be used for conducting only recording or only reproducing, and may be used for conducting both of the recording and reproducing. Further, it may be used for conducting the recording onto one optical information recording medium, and conducting the reproducing onto another optical information recording medium, and it may be used for conducting the recording or reproducing onto an optical information recording medium, and conducting the recording and reproducing onto another optical information recording medium. In this connection, the reproduction used herein includes also only the reading of the information.

The optical pick-up apparatus of the present invention can be mounted onto the recording and/or reproducing apparatus of the digital data including the voice and image of each kind of player or drive, or a media equipment in which these are assembled, personal computer and other information devices.

EMBODIMENT OF THE INVENTION

Figure 2:
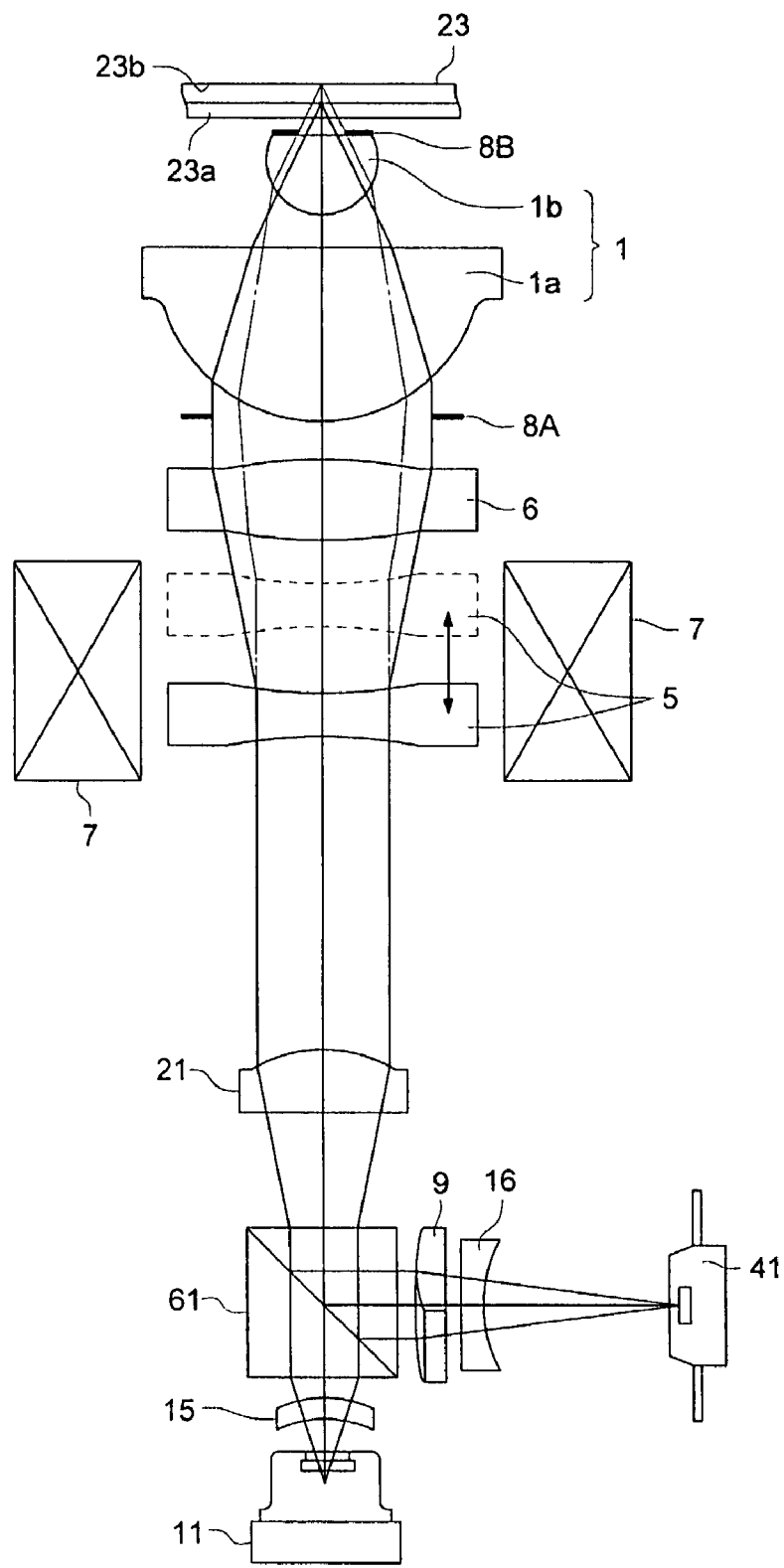
FIG. 2 is an outline structural view of an optical pick-up apparatus by which the recording or reproducing of the information can be conducted onto a multi-layer type optical information recording medium which is an embodiment of the present invention.

Referring to the drawings, an embodiment of the invention will be described below. FIG. 2 is an outline structural view of an optical pick-up apparatus by which the recording or reproducing of the information can be conducted onto a multi-layer type optical information recording medium which is an embodiment of the present invention. In FIG. 2, the divergent angle of the information recording light emitted from the first light source 11 is changed by a coupling lens 15, and after the light passes through a beam splitter 61, the divergent angle is changed by a coupling lens 21, and after passed through an ¼ wavelength plate 71, the light passes through a beam splitter 62, and passes through a negative lens 5 and positive lens which are displaceable in the optical axis direction, and enters into an objective lens 1 stopped down by a diaphragm 8A. In the present embodiment, the objective lens 1 is structured by the second lens 1a and the solid immersion lens 1b which is a final optical element. The information recording light emitted from the objective lens 1 is not stopped down by the diaphragm 8B arranged on the emitting surface 1b of the solid immersion lens, and image formed onto the first recording layer 23a of a multi-layer (in which a plurality of (herein, 2) information recording layers are provided) type optical information recording medium 23, and the information is recorded or reproduced. It is preferable that the second lens 1a of the objective lens 1 and the solid immersion lens 1b which is a SIL (Solid Immersion Lens) (or another optical element), are formed of the plastic material whose saturation water absorption is not larger than 5%. The beam expander is structured by the negative lens 5, positive lens 6, and an actuator 7. Further, a light converging optical system is composed of the coupling lens 15, 21, negative lens 5, positive lens 6, and objective lens 1.

The light reflected by the first recording layer 23a of the optical information recording medium 23 goes the same light path, and is reflected by the beam splitter 62, and image-formed onto the light receiving surface of a light detector 41 through a cylindrical lens 9 and concave lens 16.

On the one hand, the information recording light irradiated from the second light source 12, passes through a hologram 17, and the divergent angle is changed by a coupling lens 22, and after the light passes through ¼ wavelength plate, it is reflected by a beam splitter 62, and by an actuator 7, it passes the displaceable negative lens 5 and positive lens 4, and is not stopped down by the diaphragm 8A, and enters into the objective lens 1. The information recording light emitted from the objective lens 1 is image-formed onto the second recording layer 23b after it is stopped down by the diaphragm 8B arranged on the emitting surface 1b of the solid immersion lens, and the recording or reproducing of the information is conducted.

The light reflected by the second recording layer 23b of the optical information recording medium 23 passes the same light path and reflected by the beam splitter 62, and image-formed onto the light receiving surface of the light detector 42 through the ¼ wavelength plate 72, coupling lens 22, and hologram 17 which separates the reflected light.

Herein, the interval between the solid immersion lens 1b and the optical information recording medium 23 is, as shown in FIG. 1, not larger than ¼ of the wavelength of the information recording light. Accordingly, according to the present embodiment, by using the near field effect, the recording or reproducing of the information can be conducted onto the information recording surface of each of information recording layers, through a protective layer (not shown) of the optical information recording medium 23 by the information recording light whose image side numerical aperture (NA) is not smaller than 1, including the evanescent light from the solid immersion lens 1b.

Further, in the present embodiment, when the negative lens 5 is moved in the optical axis direction by the actuator 7, the recording or reproducing of the information may be conducted onto the different information recording layers. Specifically, when the interval between the negative lens 5 and positive lens 6b is increased, the recording or reproducing of the information is conducted onto the information recording layer 23a nearer to the solid immersion lens 1b, and when the interval between the negative lens 5 and positive lens 6 is reduced, the recording or reproducing of the information can be conducted onto the information recording layer 23b farther from the solid immersion lens 1b. In the present embodiment, a selection means is structured by beam expanders (5, 6, 7) which function as a transfer apparatus to change the divergent angle of the luminous flux, and further, function as the optical element to change the information recording layers onto which the recording or reproducing of the information is to be conducted.

Further, in the present embodiment, corresponding to a fact that the wavelengths of the first light source 11 and the second light source 12 are different, by using that the focal distance of the objective lens changes, the recording or reproducing of the information may be conducted onto the different information recording layers thereby. In such the case, the selection means used in the present invention means that the first light source 11, and second light source 12, and each of optical systems through which the information recording light irradiated from them passes. Such the optical system is, in the present embodiment, used as a common in a portion, however, it may be an independently separated one. However, when the optical element constituting each optical system is formed of a material whose internal transmissivity is not smaller than 85% at the 3 mm thickness, the loss at the time of light transmission can be preferably suppressed.

In this connection, in order to selectively conducting the recording or reproducing of the information onto each of information recording layers 23a, 23 b of the optical information recording medium 23, it is considered that, for example, 2 of the second lenses 1a of the objective lens, or the solid immersion lenses 1b are prepared, and are separately used corresponding to the information recording layers onto which the recording or reproducing of the information is required to be conducted.

As a means or correcting the variation of the spherical aberration and axial chromatic aberration, when the optical surface of the second lens 1a of the objective lens 1 is formed into an aspherical surface, the aberration becomes fine, and further, when the diffraction ring band is formed on the optical surface, the axial chromatic aberration correction or the temperature correction becomes possible. However, such the aspherical surface or diffraction ring band may be provided on another optical element (the coupling lens 15, 21, 22, negative lens 5, positive lens 6).

When the negative lens 5 and positive lens 6 are used as a means for correcting the variation of the spherical aberration and axial chromatic aberration, it may be preferable when the following expression is satisfied.

$$vdP > vdN \tag{1}$$

Particularly, it is preferable when the following expressions are satisfied.

$$vdP > 55 \tag{2}$$

$$vdN < 35 \tag{3}$$

Where, vdP: the average of Abbe's number of the d line of the positive lens 6, and vdN: the average of Abbe's number of the d line of the negative lens 5.

Figure 3:
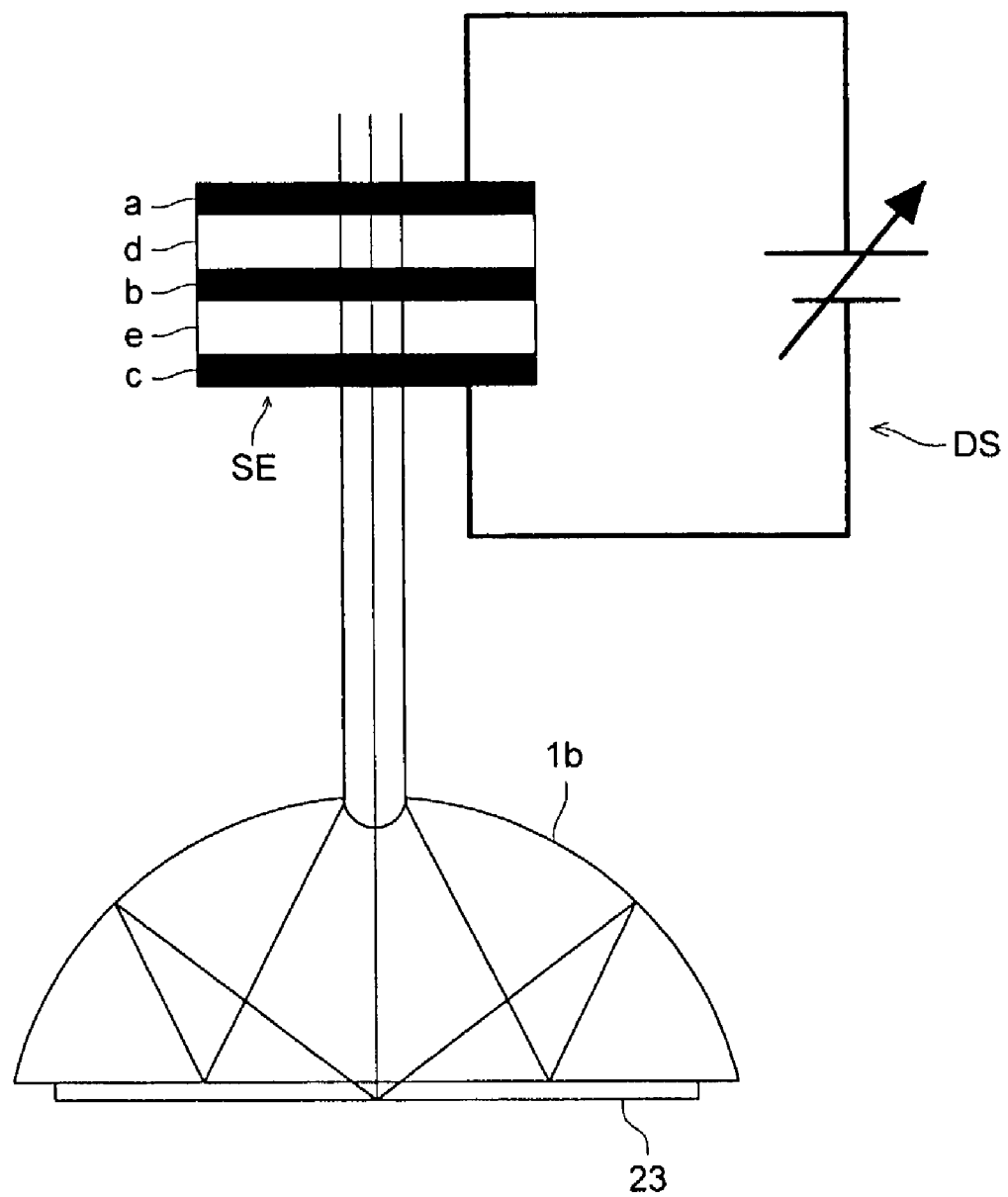
FIG. 3 is an outline structural view showing an optical system according to the second embodiment.

FIG. 3 is an outline structural view showing the optical system according to the second embodiment. In the present embodiment, it is different that, instead of the beam expander shown in FIG. 2, the optical element SE is used and the light converging optical system is structured. The optical system SE as the changing means is an element by which the refractive index distribution can be changed, and in FIG. 3, it is arranged on the light source (not shown) side of the solid immersion lens 1b.

The optical element SE is formed in such a manner that, as shown in FIG. 3, for example, an electrode layers a, b, and c which are electrically connected and optically transparent, and a refractive index changeable layers d, e, which are electrically insulated from the electrode layers a, b, c, and by which the refractive index distribution is changed corresponding to the applied voltage, are alternately laminated, and the optically transparent electrodes a, b, c are divided into a plurality of areas.

Herein, by using the optical element SE, to select the information recording layers of the multi-layer type optical information recording medium 23, the voltage is applied onto the electrode layers a, b c by the drive apparatus DS of the optical element SE, and when the refractive index of the refractive index changeable layers d, e is changed corresponding to the place, and the phase of the emitted light from the optical element SE toward the solid immersion lens 1b is controlled, the divergence degree or convergence degree of the incident light into the solid immersion lens 1b can be changed. When the divergence degree or convergence degree of the incident light into the solid immersion lens 1b is changed, the image formation position of the light which is light converged by the solid immersion lens 1b is changed, thereby, the information recording layer onto which the information is recorded or reproduced can be changed.

Figure 4:
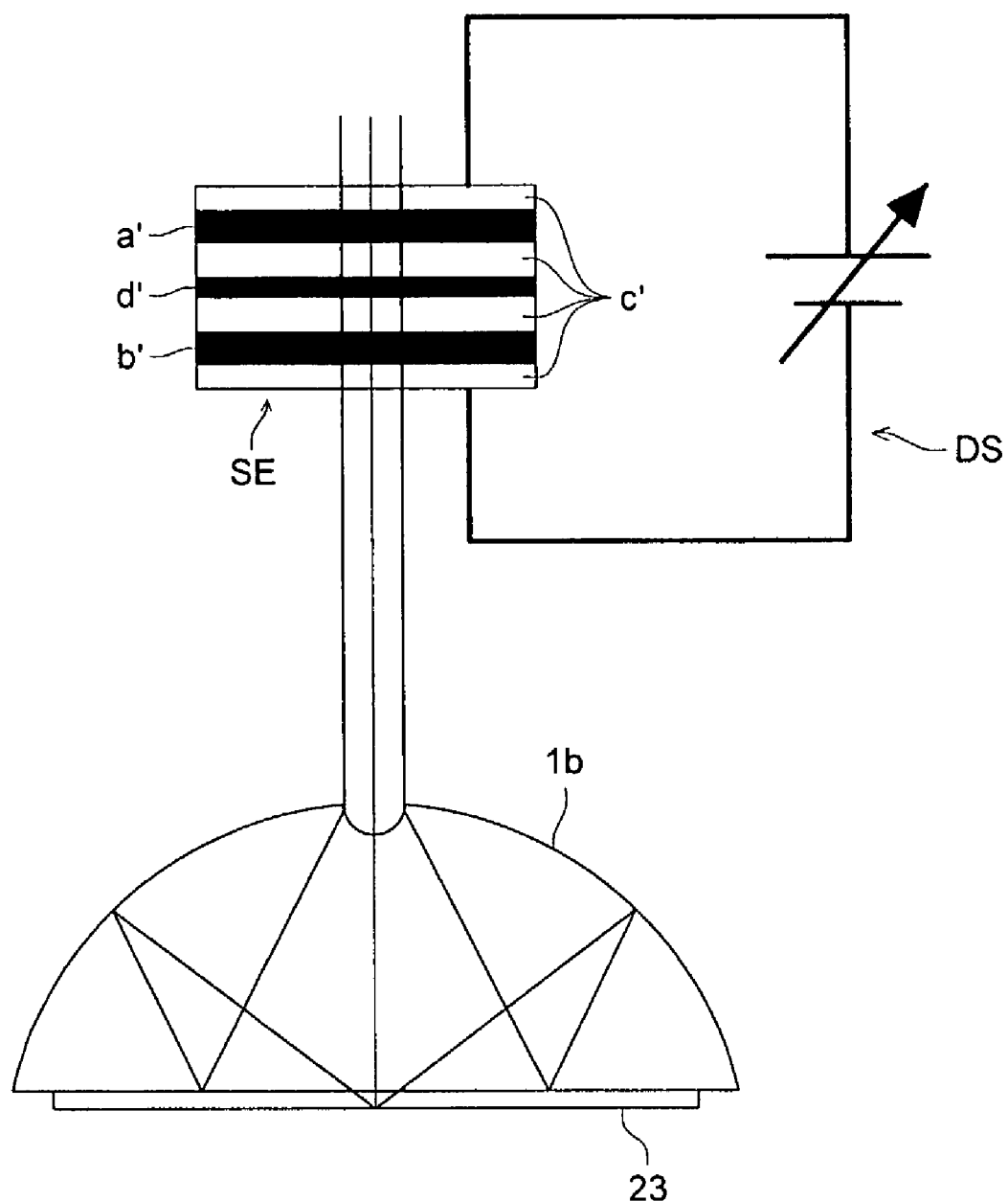
FIG. 4 is an outline structural view showing an optical system according to the third embodiment.

FIG. 4 is an outline structural view showing the optical system according to the third embodiment. In the present embodiment, the optical element SE as the changing means is provided with a liquid crystal element a' in which the liquid crystal molecule is arranged aligning in the arbitrary X direction, in the vertical surface to the optical axis, and a liquid crystal element b' in which the liquid crystal molecule is arranged aligning in the Y direction perpendicular to the X direction, in the vertical surface to the optical axis, and by the liquid crystal element a', b', the glass substrate c' is nipped, and alternately laminated, and a ½ wavelength plate d' is arranged between the inside glass substrates c'.

Herein, by using the optical element SE, to select the information recording layer of the multi-layer type optical information recording medium 23, when the voltage is applied onto the liquid crystal elements a', b' by the drive apparatus DS of the optical element SE, and the X direction component and Y direction component of the phase of the emitted light from the optical element SE are independently controlled, the divergence degree or convergence degree of the incident light into the solid immersion lens 1b can be changed. When the divergence degree or convergence degree of the incident light into the solid immersion lens 1b is changed, the image formation position of the light which is light converged by the solid immersion lens 1b is changed, thereby, the information recording layer onto which the information is recorded or reproduced can be changed.

As described above, according to the optical element SE shown in FIGS. 3 and 4, when the refractive index distribution is generated corresponding to the voltage impression, thereby, the layer which is an object of the recording or reproducing is changed, the light converging optical system not having movable parts and having a mechanically simple structure can be provided. In this connection, as it is well known, by the optical element SE, the variation of the spherical aberration can also be corrected.

Figure 5:
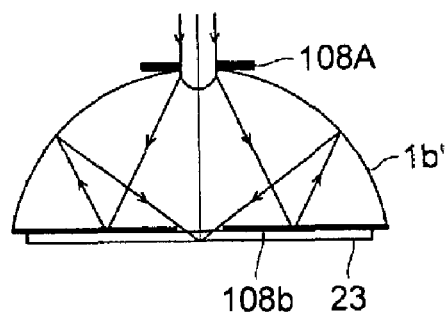
FIGS. 5(a) and 5(b) each is a view showing the relationship between the final optical element and diaphragm according to the fourth embodiment.
Figure 5:
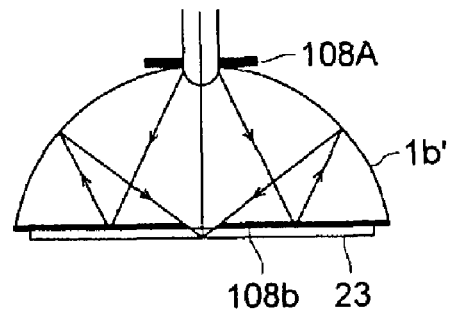

FIG. 5 is a view showing the relationship between the final optical element and the diaphragm, according to the fourth embodiment. As shown in FIG. 5(a), the information recording light by which the information is recorded or reproduced onto the first information recording layer 23a (FIG. 2) of the information recording layers 23 is stopped down by the diaphragm 108A arranged on the incident surface side of a single dioptric SIM (Solid Immersion Mirror, hereinafter, called SIM), 1b' as the final optical element supported through an interval not larger than ¼ of the using wavelength to the optical information recording medium 23, and as shown in FIG. 5(b), the information recording light by which the information is recorded or reproduced onto the second information recording layer 23b (FIG. 2) of the information recording layers 23 is stopped down by the diaphragm (transmission opening portion) 108B arranged between the SIM 1b' and optical information recording medium 23.

Figure 6:
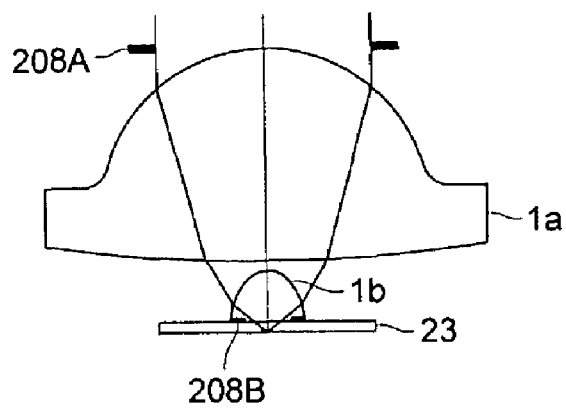
FIGS. 6(a) and 6(b) each is a view showing the relationship between the objective lens and diaphragm according to the fifth embodiment.
Figure 6:
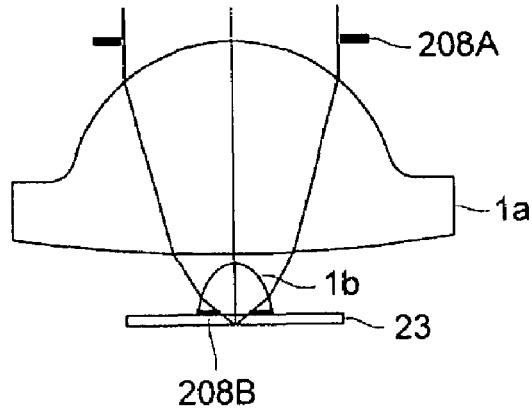

FIG. 6 is a view showing the relationship between the objective lens and the diaphragm according to the fifth embodiment. As shown in FIG. 6(a), the information recording light by which the information is recorded or reproduced onto the first information recording layer 23a (FIG. 2) of the information recording layers 23 is stopped down by the diaphragm 208A arranged on the incident surface side of the second lens 1a of the objective lens, and as shown in FIG. 5(b), the information recording light by which the information is recorded or reproduced onto the second information recording layer 23b (FIG. 2) of the information recording layers 23 is stopped down by a diaphragm (transmission opening portion) 208B arranged between the solid immersion lens 1b and the optical information recording medium 23. According to the 4 and 5 invention described above, the image side numerical aperture (NA) in the case where the information is recorded or reproduced onto each of information recording layers can be respectively independently set when the diameters of the apertures of the diaphragms 108A and 108B or 208A and 208B are adjusted.

Figure 7:
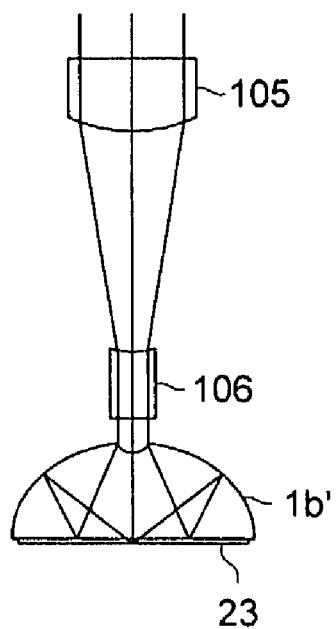
FIGS. 7(a) and 7(b) each is a view showing a light converging optical system according to the sixth embodiment.
Figure 7:
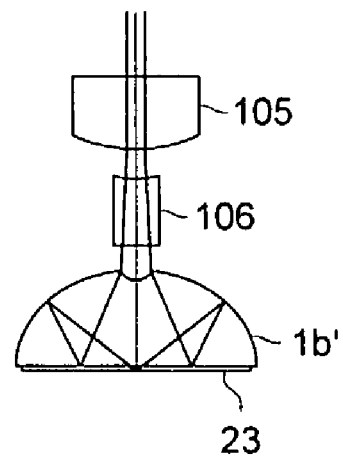

FIG. 7 is a view showing a light converging optical system according to the sixth embodiment. The light converging optical system of the present embodiment is structured by a SIM 1b' supported through the interval not larger than ¼ of the using wavelength to the multi-layer type optical information recording medium 23, and a beam expander structured by respectively one positive lens 105 and one negative lens 106 from the light source side, not shown. When, from the position shown in FIG. 7(a), only the positive lens 105 of the beam expander is moved along the optical axis to the SIM 1b' side (position shown in FIG. 7(b)), the divergence degree of the incident light into the SIM 1b' is changed, thereby, the information recording layer of the optical information recording medium 23 which is an object to record or reproduce the information, is changed. In this connection, the order of the positive lens 105 and negative lens 106 is not also concerned about the order of the negative lens and positive lens from the light source.

Figure 8A:
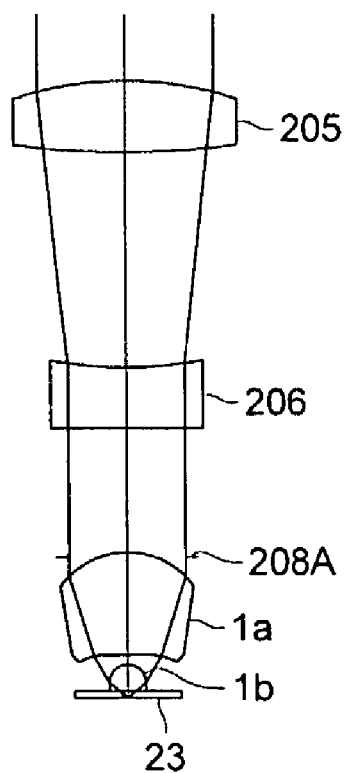
FIGS. 8(a) and 8(b) each is a view showing the light converging optical system according to the seventh embodiment.
Figure 8B:
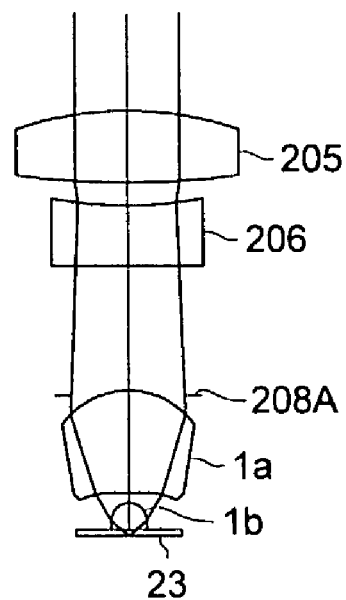

FIG. 8 is a view showing a light converging optical system according to the seventh embodiment. The light converging optical system of the present embodiment is structured by a solid immersion lens 1b supported through the interval of ¼ of the using wavelength to the multi-layer type optical information recording medium 23, and a beam expander structured by respectively one positive lens 205 and one negative lens 206 from the light source side, not shown. When, from the position shown in FIG. 8(a), only the positive lens 205 of the beam expander is moved along the optical axis to the solid immersion lens 1b side (position shown in FIG. 8(b)), the divergence degree of the incident light into the solid immersion lens 1b is changed, thereby, the information recording layer of the optical information recording medium 23 which is an object to record or reproduce the information, is changed.

Figure 9:
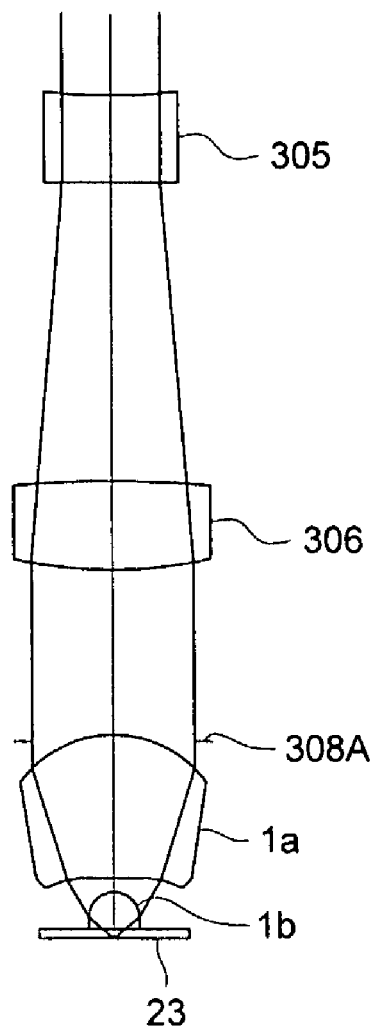
FIGS. 9(a) and 9(b) each is a view showing a light converging optical system according to the eighth embodiment.
Figure 9:
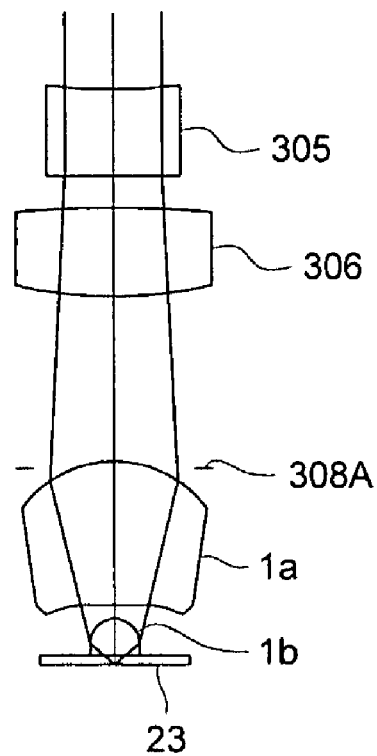

FIG. 9 is a view showing a light converging optical system according to the eighth embodiment. The light converging optical system of the present embodiment is structured by a solid immersion lens 1b supported through the interval of ¼ of the using wavelength to the multi-layer type optical information recording medium 23, and a beam expander structured by the second lens 1a and diaphragm 308A, and respectively one negative lens 305 and one positive lens 306 from the light source side, not shown. When, from the position shown in FIG. 9(a), only the negative lens 305 of the beam expander is moved along the optical axis to the solid immersion lens 1b side (position shown in FIG. 9(b)), the divergence degree of the incident light into the solid immersion lens 1b is changed, thereby, the information recording layer of the optical information recording medium 23 which is an object to record or reproduce the information, is changed.

Figure 10:
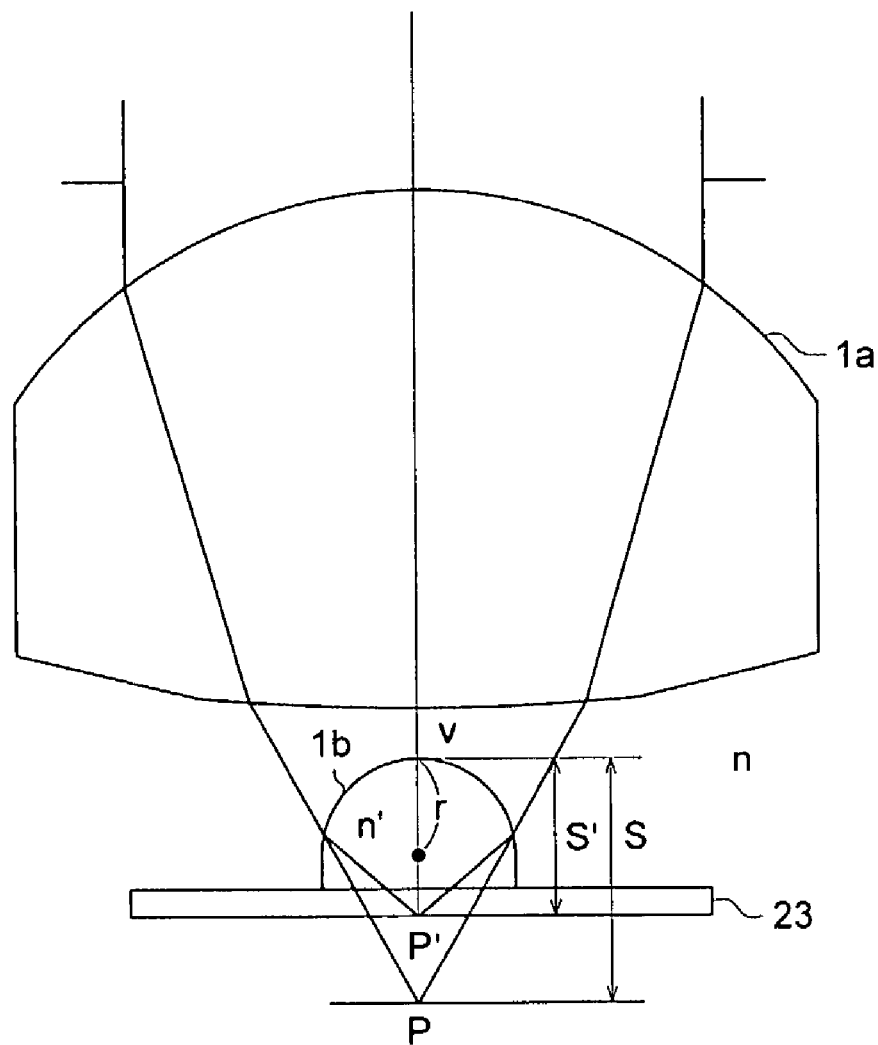
FIG. 10 is a view showing an objective lens composition according to another embodiment.

FIG. 10 is a view showing an objective lens composition according to another embodiment. In FIG. 10, the solid immersion lens 1b is a super semi-spherical lens, and structured so that the following aplanatic conditional expressions are realized. Further, the light converging point of the solid immersion lens 1b is at just an intermediate between 2 recording layers.

$$S=r(1+(n'/n)) \quad (4)$$

$$S'=r(1+(n/n')) \quad (5)$$

Where, S: the distance from the image forming point P of the second lens 1a to the apex V of the solid immersion lens 1b, S': the distance from the image forming point P' of the composite system to the apex V of the solid immersion lens 1b, r: the radius of curvature of the solid immersion lens 1b, n: the refractive index of the air, and n': the refractive index of the solid immersion lens 1b.

Herein, in FIG. 10, the numerical aperture (NA) of the second lens 1a is sin θ (θ is a half angle of the maximum conical angle of the image space of the objective lens), and NA' in the composition system of the objective lens composed of the second lens 1a and the solid immersion lens 1b can be expressed by $(n')^2 \cdot \sin θ$ (in this connection, n' is the refractive index of the solid immersion lens 1b). Further when the aberration of the objective lens is finely corrected, this solid immersion lens 1b can realize the light convergence of almost no aberration. Accordingly, when the objective lens for the existing CD, DVD is used as the objective lens, the optical system whose image side numerical aperture (NA) is not smaller than 1, and whose aberration is finely corrected, can be easily obtained.

According to the optical pick-up apparatus and objective lens of the present invention, the large capacity of optical information recording and/or reproduction, which is more increased than the conventional one, together with both the area recording density and volume recording density of the optical information recording medium, can be conducted.

What is claimed is:

1. An optical pickup apparatus for recording and/or reproducing information for an optical information recording medium having a plurality of information recording layers, comprising:

a light source to emit a light flux; and a converging optical system to converge the light flux emitted from the light source onto each information recording layer of the plurality of information recording layers, wherein the converging optical system converges a light flux having an image side-numerical aperture of 1.0 or more onto each information recording layer so as to conduct recording and/or reproducing information for each information recording layer, and wherein the converging optical system has an optical element having a diffractive surface provided with a ring-shaped diffractive structure.

2. The optical pickup apparatus of claim 1, wherein the converging optical system has a final optical element opposite to the optical information recording medium, a final optical surface of the final optical element locates close to the a surface of the optical information recording medium and a gap between the final optical surface and the surface of the optical information recording medium is smaller than a wavelength of the light source.

3. The optical pickup apparatus of claim 2, wherein the gap is not larger than (¼) of the wavelength of the light source.

4. The optical pickup apparatus of claim 1, further comprising a selecting device to select an information recording layer from the plurality of information recording layers, wherein recording and/or reproducing is conducted for the selected information recording layer.

5. The optical pickup apparatus of claim 4, wherein the selecting device changes a wavelength of the light source in accordance with the information recording layer to be conducted recording and/or reproducing.

6. The optical pickup apparatus of claim 4, wherein at a light source side of the final optical element is provided an optical element to change a degree of divergence or a degree of convergence of an incident light flux on the final optical element in accordance with the information recording layer to be conducted recording and/or reproducing.

7. The optical pickup apparatus of claim 6, wherein the optical element to change a degree of divergence or a degree of convergence comprises a positive lens having a positive refracting power and a negative lens having a negative refracting power and wherein at least one of the positive lens and the negative lens is a displaceable element.

8. The optical pickup apparatus of claim 7, wherein the optical information recording medium has a first recording layer and a second recording layer provided in that order from a final optical element side, when recording and/or reproducing is conducted for the first recording layer, a gap between the positive lens and the negative lens is increased from the case that recording and/or reproducing is conducted for the second recording layer.

9. The optical pickup apparatus of claim 6, wherein the optical element to change a degree of divergence or a degree of convergence corrects a spherical aberration or an axial chromatic aberration interfering recording and/or reproducing information for the information recording layer to be conducted recording and/or reproducing.

10. The optical pickup apparatus of claim 9, wherein the optical element to correct the spherical aberration or the axial chromatic aberration comprises a positive lens having a positive refracting power and a negative lens having a negative refracting power and satisfies the following formula:

$$vdP > vdN$$

where vdP is an Abbe's number of d-line of the positive lens, vdN is an Abbe's number of d-line of the negative lens.

11. The optical pickup apparatus of claim 10, wherein the vdP and the vdN satisfy the following formulas $$vdP > 55$$

$$vdN < 35.$$

12. The optical pickup apparatus of claim 1, wherein the converging optical system has an optical element having a aspherical surface.

13. The optical pickup apparatus of claim 1, wherein the converging optical system has an optical element made of a material having a specific gravity of 2.0 or less.

14. The optical pickup apparatus of claim 13, wherein the converging optical system has an optical element made of a plastic material.

15. The optical pickup apparatus of claim 13, wherein the converging optical system has an optical element made of a material having a saturation water absorption of 0.5% or less.

16. The optical pickup apparatus of claim 1, wherein the converging optical system has at least two diaphragms to regulate an image side-numerical aperture for the plurality of information recording layers of the optical information recording medium.

17. The optical pickup apparatus of claim 16, wherein at least one of the at least two diaphragms is located between a final optical element and the optical information recording medium.

18. The optical pickup apparatus of claim 1, wherein the converging optical system comprises an optical element formed by etching.

19. An optical pickup apparatus for recording and/or reproducing information for an optical information recording medium having a plurality of information recording layers, comprising:
 a light source to emit a light flux; and
 a converging optical system to converge the light flux emitted from the light source onto each information recording layer of the plurality of information recording layers,
 wherein the converging optical system comprises a final optical element opposite to the optical information recording medium
 wherein the converging optical system converges a light flux having an image side-numerical aperture of 1.0 or more onto each information recording layer so as to conduct recording and/or reproducing information for each information recording layer,
 wherein the converging optical system comprises a positive lens having a positive refractive power and a negative lens having a negative refracting power and wherein at least one of the positive lens and the negative lens has a negative refracting power, and
 wherein the following formula is satisfied:

$$vdP > vdN$$

where vdP is an Abbe's number of d-line of the positive lens and vdN is an Abbe's number of d-line of the negative lens.

20. The optical pickup apparatus of claim 19, wherein the converging optical system comprises the final optical element opposite to the optical information recording medium with a gap, and the gap is not larger than (¼) of the wavelength of the light source.

21. The optical pickup apparatus of claim 19, further comprising a selecting device to select an information recording layer from the plurality of information recording layers, wherein recording and/or reproducing is conducted for the selected information recording layer.

22. The optical pickup apparatus of claim 21, wherein the selecting device changes a wavelength of the light source in accordance with the information recording layer to be conducted recording and/or reproducing.

23. The optical pickup apparatus of claim 21, wherein the optical information recording medium has a first recording layer and a second recording layer provided in that order from a final optical element side, when recording and/or reproducing is conducted for the first recording layer, a gap between the positive lens and the negative lens is increased from the case that recording and/or reproducing is conducted for the second recording layer.

24. The optical pickup apparatus of claim 19, wherein the positive lens and the negative lens form an optical element to change a degree of divergence or a degree of convergence, wherein the optical element corrects a spherical aberration or an axial chromatic aberration interfering recording and/or reproducing information for the information recording layer to be conducted recording and/or reproducing.

25. The optical pickup apparatus of claim 24, wherein the vdP and the vdN satisfy the following formulas $$vdP > 55$$

$$vdN < 35.$$

26. The optical pickup apparatus of claim 19, wherein the converging optical system has an optical element having a aspherical surface.

27. The optical pickup apparatus of claim 19, wherein the converging optical system has an optical element having a diffractive surface provided with a ring-shaped diffractive structure.

28. The optical pickup apparatus of claim 19, wherein the converging optical system has an optical element made of a material having a specific gravity of 2.0 or less.

29. The optical pickup apparatus of claim 28, wherein the converging optical system has an optical element made of a plastic material.

30. The optical pickup apparatus of claim 28, wherein the converging optical system has an optical element made of a material having a saturation water absorption of 0.5% or less.

31. The optical pickup apparatus of claim 19, wherein the converging optical system has at least two diaphragms to regulate an image side-numerical aperture for the plurality of information recording layers of the optical information recording medium.

32. The optical pickup apparatus of claim 31, wherein at least one of the at least two diaphragms is located between a final optical element and the optical information recording medium.

33. The optical pickup apparatus of claim 19, wherein the converging optical system comprises an optical element formed by etching.

34. A converging optical system for use in an optical pickup apparatus having a light source to emit a light flux and for recording and/or reproducing information for an optical information recording medium having a plurality of information recording layers, comprising:
 the converging optical system to converge the light flux emitted from the light source onto each information recording layer of the plurality of information recording layers,
 wherein the converging optical system converges a light flux having an image side-numerical aperture of 1.0 or more onto each information recording layer so as to conduct recording and/or reproducing information for each information recording layer, and
 wherein the converging optical system has an optical element having a diffractive surface provided with a ring-shaped diffractive structure.

35. The converging optical system of claim 34, wherein the converging optical system has a final optical element opposite to the optical information recording medium, a final optical surface of the final optical element locates close to the a surface of the optical information recording medium and a gap between the final optical surface and the surface of the optical information recording medium is smaller than a wavelength of the light source.

36. The converging optical system of claim 35, wherein the gap is not larger than (¼) of the wavelength of the light source.

37. The converging optical system of claim 34, further comprising a plurality of converging optical systems as the converging optical system and each of the plurality of converging optical systems is used to conduct recording and/or reproducing information for an information recording layer different from that of others.

38. The converging optical system of claim 34, further comprising a selecting device to select an information recording layer from the plurality of information recording layers, wherein recording and/or reproducing is conducted for the selected information recording layer.

39. The converging optical system of claim 38, wherein the selecting device changes a wavelength of the light source in accordance with the information recording layer to be conducted recording and/or reproducing.

40. The converging optical system of claim 38, wherein at a light source side of the final optical element is provided an optical element to change a degree of divergence or a degree of convergence of an incident light flux on the final optical element in accordance with the information recording layer to be conducted recording and/or reproducing.

41. The converging optical system of claim 40, wherein the optical element to change a degree of divergence or a degree of convergence comprises a positive lens having a positive refracting power and a negative lens having a negative refracting power and wherein at least one of the positive lens and the negative lens is a displaceable element.

42. The converging optical system of claim 41, wherein the optical information recording medium has a first recording layer and a second recording layer provided in that order from a final optical element side, when recording and/or reproducing is conducted for the first recording layer, a gap between the positive lens and the negative lens is increased from the case that recording and/or reproducing is conducted for the second recording layer.

43. The converging optical system of claim 40, wherein the optical element to change a degree of divergence or a degree of convergence corrects a spherical aberration or an axial chromatic aberration interfering recording and/or reproducing information for the information recording layer to be conducted recording and/or reproducing.

44. The converging optical system of claim 43, wherein the optical element to correct the spherical aberration or the axial chromatic aberration comprises a positive lens having a positive refracting power and a negative lens having a negative refracting power and satisfies the following formula:

$$vdP > vdN$$

where vdP is an Abbe's number of d-line of the positive lens, vdN is an Abbe's number of d-line of the negative lens.

45. The converging optical system of claim 44, wherein the vdP and the vdN satisfy the following formulas $$vdP > 55$$

$$vdN < 35.$$

46. The converging optical system of claim 34, wherein the converging optical system has an optical element having a aspherical surface.

47. The converging optical system of claim 34, wherein the converging optical system has an optical element made of a material having a specific gravity of 2.0 or less.

48. The converging optical system of claim 47, wherein the converging optical system has an optical element made of a plastic material.

49. The converging optical system of claim 47, wherein the converging optical system has an optical element made of a material having a saturation water absorption of 0.5% or less.

50. The converging optical system of claim 34, wherein the converging optical system has at least two diaphragms to regulate an image side-numerical aperture for the plurality of information recording layers of the optical information recording medium.

51. The converging optical system of claim 50, wherein at least one of the at least two diaphragms is located between a final optical element and the optical information recording medium.

52. The converging optical system of claim 34, wherein the converging optical system comprises an optical element formed by etching.

53. A converging optical system for use in an optical pickup apparatus having a light source to emit a light flux and for recording and/or reproducing information for an optical information recording medium having a plurality of information recording layers, comprising:

the converging optical system to converge the light flux emitted from the light source onto each information recording layer of the plurality of information recording layers, wherein the converging optical system comprises a final optical element opposite to the optical information recording medium;

wherein the converging optical system converges a light flux having an image side-numerical aperture of 1.0 or more onto each information recording layer so as to conduct recording and/or reproducing information for each information recording layer, wherein the converging optical system comprises a positive lens having a positive refractive power and a negative lens having a negative refracting power and wherein at least one of the positive lens and the negative lens has a negative refracting power, and wherein the following formula is satisfied:

$$vdP > vdN$$

where vdP is an Abbe's number of d-line of the positive lens and vdN is an Abbe's number of d-line of the negative lens.

54. The converging optical system of claim 53, wherein the converging optical system comprises the final optical element opposite to the optical information recording medium with a gap, and the gap is not larger than (¼) of the wavelength of the light source.

55. The converging optical system of claim 53, further comprising a selecting device to select an information recording layer from the plurality of information recording layers, wherein recording and/or reproducing is conducted for the selected information recording layer.

56. The converging optical system of claim 55, wherein the selecting device changes a wavelength of the light source in accordance with the information recording layer to be conducted recording and/or reproducing.

57. The converging optical system of claim 55, wherein the optical information recording medium has a first recording layer and a second recording layer provided in that order from a final optical element side, when recording and/or reproducing is conducted for the first recording layer, a gap between the positive lens and the negative lens is increased from the case that recording and/or reproducing is conducted for the second recording layer.

58. The converging optical system of claim 53, wherein the positive lens and the negative lens form an optical element to change a degree of divergence or a degree of convergence, wherein the optical element corrects a spherical aberration or an axial chromatic aberration interfering recording and/or reproducing information for the information recording layer to be conducted recording and/or reproducing.

59. The converging optical system of claim 58, wherein the vdP and the vdN satisfy the following formulas $$vdP>55$$

$$vdN<35.$$

60. The converging optical system of claim 53, wherein the converging optical system has an optical element having a aspherical surface.

61. The converging optical system of claim 53, wherein the converging optical system has an optical element having a diffractive surface provided with a ring-shaped diffractive structure.

62. The converging optical system of claim 53, wherein the converging optical system has an optical element made of a material having a specific gravity of 2.0 or less.

63. The converging optical system of claim 62, wherein the converging optical system has an optical element made of a plastic material.

64. The converging optical system of claim 62, wherein the converging optical system has an optical element made of a material having a saturation water absorption of 0.5% or less.

65. The converging optical system of claim 53, wherein the converging optical system has at least two diaphragms to regulate an image side-numerical aperture for the plurality of information recording layers of the optical information recording medium.

66. The converging optical system of claim 65, wherein at least one of the at least two diaphragms is located between a final optical element and the optical information recording medium.

67. The optical pickup apparatus of claim 53, wherein the converging optical system comprises an optical element formed by etching.

68. A method of recording and/or reproducing information for an optical information recording medium having a plurality of information recording layers with an optical pickup apparatus which comprises a light source to emit a light flux; and a converging optical system to converge the light flux emitted from the light source onto each information recording layer of the plurality of information recording layers, the method comprising:
   conducting recording and/or reproducing information for each information recording layer by converging a light flux having an image side-numerical aperture of 1.0 or more onto each information recording layer,
   wherein the converging optical system has an optical element having a diffractive surface provided with a ring-shaped diffractive structure.

69. The method of claim 68, wherein the converging optical system has a final optical element opposite to the optical information recording medium, a final optical surface of the final optical element locates close to the a surface of the optical information recording medium and a gap between the final optical surface and the surface of the optical information recording medium is smaller than a wavelength of the light source.

70. The method of claim 69, wherein the gap is not larger than (¼) of the wavelength of the light source.

71. The method of claim 68, wherein the optical pickup apparatus further comprises a selecting device to select an information recording layer from the plurality of information recording layers, wherein recording and/or reproducing is conducted for the selected information recording layer.

72. The method of claim 71, wherein the selecting device changes a wavelength of the light source in accordance with the information recording layer to be conducted recording and/or reproducing.

73. The method of claim 71, wherein at a light source side of the final optical element is provided an optical element to change a degree of divergence or a degree of convergence of an incident light flux on the final optical element in accordance with the information recording layer to be conducted recording and/or reproducing.

74. The method of claim 73, wherein the optical element to change a degree of divergence or a degree of convergence comprises a positive lens having a positive refracting power and a negative lens having a negative refracting power and wherein at least one of the positive lens and the negative lens is a displaceable element.

75. The method of claim 74, wherein the optical information recording medium has a first recording layer and a second recording layer provided in that order from a final optical element side, when recording and/or reproducing is conducted for the first recording layer, a gap between the positive lens and the negative lens is increased from the case that recording and/or reproducing is conducted for the second recording layer.

76. The method of claim 73, wherein the optical element to change a degree of divergence or a degree of convergence corrects a spherical aberration or an axial chromatic aberration interfering recording and/or reproducing information for the information recording layer to be conducted recording and/or reproducing.

77. The method of claim 76, wherein the optical element to correct the spherical aberration or the axial chromatic aberration comprises a positive lens having a positive refracting power and a negative lens having a negative refracting power and satisfies the following formula:

$$vdP>vdN$$

where vdP is an Abbe's number of d-line of the positive lens, vdN is an Abbe's number of d-line of the negative lens.

78. The method of claim 77, wherein the vdP and the vdN satisfy the following formulas $$vdP>55$$

$$vdN<35.$$

79. The method of claim 68, wherein the converging optical system has an optical element having a aspherical surface.

80. The method of claim 68, wherein the converging optical system has an optical element made of a material having a specific gravity of 2.0 or less.

81. The method of claim 80, wherein the converging optical system has an optical element made of a plastic material.

82. The method of claim 80, wherein the converging optical system has an optical element made of a material having a saturation water absorption of 0.5% or less.

83. The method of claim 68, wherein the converging optical system has at least two diaphragms to regulate an image side-numerical aperture for the plurality of information recording layers of the optical information recording medium.

84. The method of claim 83, wherein at least one of the at least two diaphragms is located between a final optical element and the optical information recording medium.

85. The method of claim 68, wherein the converging optical system comprises an optical element formed by etching.

86. A method of recording and/or reproducing information for an optical information recording medium having a plurality of information recording layers with an optical pickup apparatus which comprises a light source to emit a light flux; and a converging optical system to converge the light flux emitted from the light source onto each information recording layer of the plurality of information recording layers, and wherein the converging optical system comprises a final optical element opposite to the optical information recording medium; the method comprising a step of:

conducting recording and/or reproducing information for each information recording layer by converging a light flux having an image side-numerical aperture of 1.0 or more onto each information recording layer, wherein the converging optical system comprises a positive lens having a positive refractive power and a negative lens having a negative refracting power and wherein at least one of the positive lens and the negative lens has a negative refracting power, and wherein the following formula is satisfied:

$$vdP > vdN$$

where vdP is an Abbe's number of d-line of the positive lens and vdN is an Abbe's number of d-line of the negative lens.

87. The method of claim 86, wherein the converging optical system comprises the final optical element opposite to the optical information recording medium with a gap, and the gap is not larger than (¼) of the wavelength of the light source.

88. The method of claim 86, wherein the optical pickup apparatus further comprises a selecting device to select an information recording layer from the plurality of information recording layers, wherein recording and/or reproducing is conducted for the selected information recording layer.

89. The method of claim 88, wherein the selecting device changes a wavelength of the light source in accordance with the information recording layer to be conducted recording and/or reproducing.

90. The method of claim 88, wherein the optical information recording medium has a first recording layer and a second recording layer provided in that order from a final optical element side, when recording and/or reproducing is conducted for the first recording layer, a gap between the positive lens and the negative lens is increased from the case that recording and/or reproducing is conducted for the second recording layer.

91. The method of claim 86, wherein the positive lens and the negative lens form an optical element to change a degree of divergence or a degree of convergence, wherein the optical element corrects a spherical aberration or an axial chromatic aberration interfering recording and/or reproducing information for the information recording layer to be conducted recording and/or reproducing.

92. The method of claim 91, wherein the vdP and the vdN satisfy the following formulas $$vdP > 55$$

$$vdN < 35.$$

93. The method of claim 86, wherein the converging optical system has an optical element having a aspherical surface.

94. The method of claim 86, wherein the converging optical system has an optical element having a diffractive surface provided with a ring-shaped diffractive structure.

95. The method of claim 86, wherein the converging optical system has an optical element made of a material having a specific gravity of 2.0 or less.

96. The method of claim 95, wherein the converging optical system has an optical element made of a plastic material.

97. The method of claim 95, wherein the converging optical system has an optical element made of a material having a saturation water absorption of 0.5% or less.

98. The method of claim 86, wherein the converging optical system has at least two diaphragms to regulate an image side-numerical aperture for the plurality of information recording layers of the optical information recording medium.

99. The method of claim 98, wherein at least one of the at least two diaphragms is located between a final optical element and the optical information recording medium.

100. The method of claim 86, wherein the converging optical system comprises an optical element formed by etching.

* * * * *